United States Patent [19]

Surauer et al.

[11] Patent Number: 5,042,752
[45] Date of Patent: Aug. 27, 1991

[54] APPARATUS FOR CONTROLLING THE ATTITUDE OF AND STABILIZING AN ELASTIC BODY

[75] Inventors: Michael Surauer, Chieming; Francois Porte; Helmut Bittner, both of Munich, all of Fed. Rep. of Germany

[73] Assignee: Messerschmitt-Bölkow-Blohm GmbH, Munich, Fed. Rep. of Germany

[21] Appl. No.: 359,760

[22] PCT Filed: Sep. 16, 1988

[86] PCT No.: PCT/DE88/00581

§ 371 Date: Jul. 14, 1989

§ 102(e) Date: Jul. 14, 1989

[87] PCT Pub. No.: WO89/02622

PCT Pub. Date: Mar. 23, 1989

[30] Foreign Application Priority Data

Sep. 16, 1987 [DE] Fed. Rep. of Germany ....... 3731087

[51] Int. Cl.⁵ ................ B64G 1/26; B64G 1/28/1/36; B64G 1/38
[52] U.S. Cl. .................................... 244/164; 244/165; 244/169; 244/170; 244/171; 364/459
[58] Field of Search ............... 244/164, 165, 169, 170, 244/171, 3.21, 3.22, 3.1, 3.2; 364/459, 434

[56] References Cited

U.S. PATENT DOCUMENTS

| | | | |
|---|---|---|---|
| 3,624,367 | 11/1971 | Hamilton | 364/459 X |
| 3,866,025 | 2/1975 | Cavanagh | 364/459 X |
| 4,174,819 | 11/1979 | Brüderle et al. | 244/171 X |
| 4,272,045 | 6/1981 | Phillips | 244/171 X |
| 4,288,051 | 9/1981 | Göschel | 244/171 X |
| 4,294,420 | 10/1981 | Broquet | 244/165 |
| 4,358,076 | 11/1982 | Lange et al. | 244/171 X |
| 4,424,948 | 1/1984 | Muhlfelder et al. | 244/71 |
| 4,504,912 | 3/1985 | Brüderle et al. | 364/459 X |
| 4,521,855 | 6/1985 | Lehner et al. | 364/459 X |
| 4,537,375 | 8/1985 | Chan | 244/171 |
| 4,567,564 | 1/1986 | Bittner et al. | 244/171 |
| 4,591,118 | 5/1986 | Chan | 244/171 |
| 4,599,697 | 7/1986 | Chan et al. | 244/169 X |
| 4,617,634 | 10/1986 | Izumida et al. | 144/171 X |
| 4,725,024 | 2/1988 | Vorlicek | 244/169 X |
| 4,758,957 | 7/1988 | Hubert et al. | 244/169 X |
| 4,848,706 | 7/1989 | Garg et al. | 244/169 |

FOREIGN PATENT DOCUMENTS

| | | | |
|---|---|---|---|
| 209429 | 1/1987 | European Pat. Off. | 244/165 |
| 251692 | 1/1988 | European Pat. Off. | 244/171 |
| 2601159 | 1/1988 | France | 244/171 |

OTHER PUBLICATIONS

Bittner, et al., "The attitude determination and Control Subsystem of the Intelsat V Spacecraft", 11/1977. Proceedings of AOCS Conference, 10/3-6/7 (ESA SP-128, 11/1977).

Primary Examiner—Margaret A. Focarino
Assistant Examiner—James M. Kannofsky
Attorney, Agent, or Firm—Kenyon & Kenyon

[57] ABSTRACT

A device is disclosed for regulating a set value and/or for stabilizing elastic objects subject to spin and free to move around their axis of rotation, in particular aircraft and spacecraft. For that purpose, the regulating signals required to regulate the set value or to stabilize the freely moving objects can be obtained by means of a regulator having a transfer function with a denominator degree about three orders higher than the numerator.

22 Claims, 18 Drawing Sheets

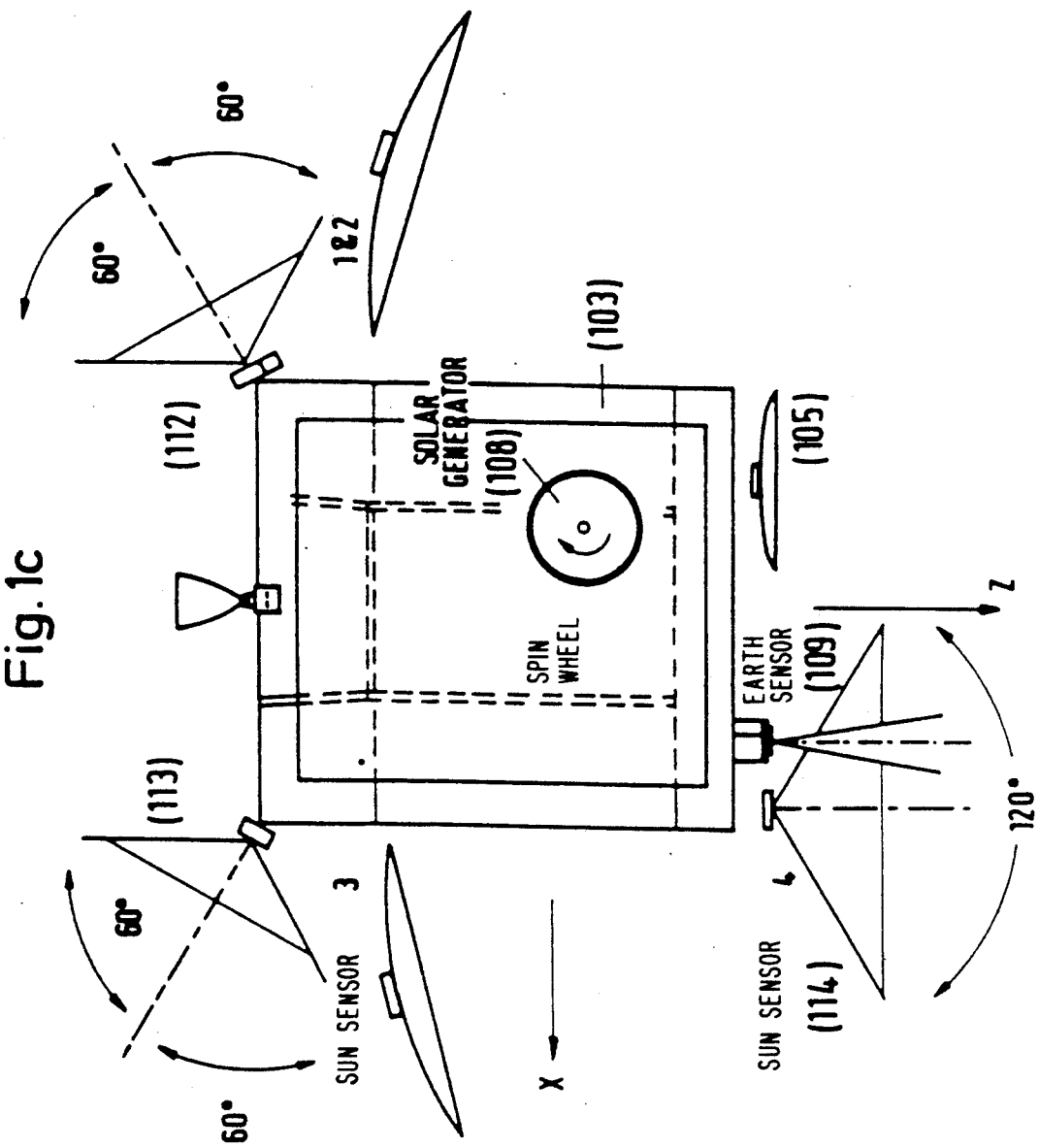

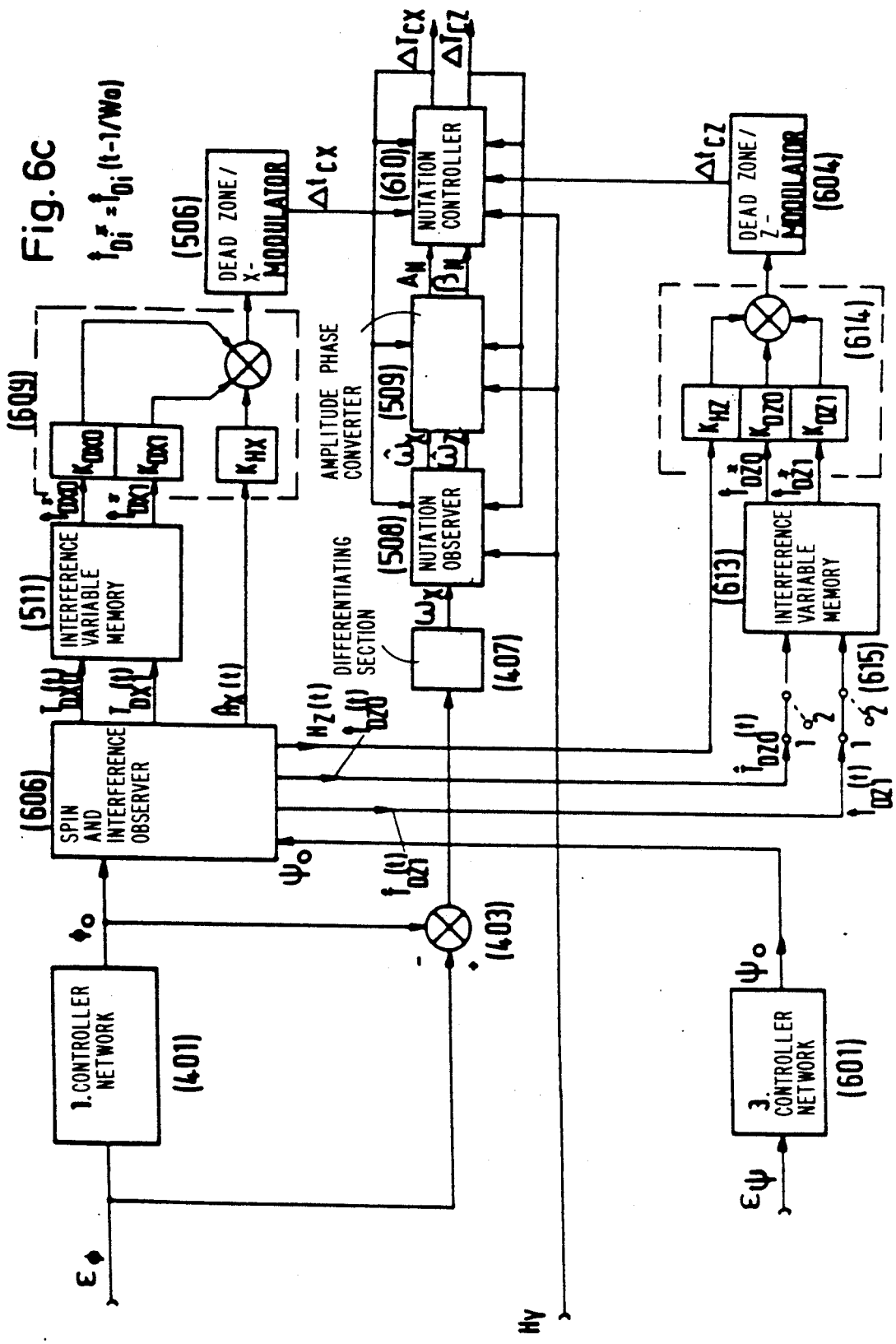

APPARATUS FOR CONTROLLING THE ATTITUDE OF AND STABILIZING AN ELASTIC BODY

The invention relates to the improvement of devices for the servo control and stabilization of bodies, which are free to move about axes of rotation, particularly aircraft and space vehicles which, due to rotation about one of their principal axes, the so-called spin axis or due to spin storage devices built in especially for this purpose, have an angular momentum or "spin" different from zero.

As is well known, the dynamic motion of bodies, which have a stored spin, follows the laws of gyroscopic theory. In bodies, which are free to move about their axes of rotation, such as aircraft and space vehicles, a stored spin causes, in particular, a strong coupling of the motion variables characterizing the rotary motion about the principal axes of the body orthogonal to the spin axis, such as torques, angular velocities and excursions.

If now such a freely movable body is to be oriented by means of a closed control loop from a starting attitude according to preset directions in space and is to be stabilized with respect to this angular position, the control laws, which are to accomplish this, must take these conditions more and more into consideration the smaller the control torque levels available for stabilization are in relation to the gyroscopic couplings. If discrete, for instance, pulse-shaped control actions are applied for reasons of saving energy, as is frequently the case if reaction jets are used in space vehicles, a frequently undesired nutation motion is excited instead of a processional motion as in the case of continuous control torques.

Additional problems arise with the reference or set value control and stabilization of such vehicles due to their large dimensions, their degree of slimness and/or their weight-saving construction due to the existence of weakly damped structure vibrations and the danger of exciting such vibrations by pulse-shaped control interventions.

Flexible bodies of the kind under consideration, which are free to move in space, especially satellites moving in orbits around the earth, consist in general of a spingenerating rotating part or a spin storage device with, in principle, an equivalent effect, such as a reaction flywheel, as well as a nonrotating part, such as a despun platform or the central body of the satellite itself. This nonrotating part is always to be oriented with one of its body axes, which is orthogonal to the spin axis, as accurately as possible towards the earth, because it is to maintain communications links, for instance, via transmitting and receiving devices, continuously between different points of the globe. If such a body moves on its orbit around the earth, the despun part carrying the payload must also rotate once per orbit about an axis pointing perpendicularly to the plane of the orbit. For this reason, such vehicles are also called "dual spinners".

It is seen from the conditions described that at least three different kinds of periodic, practically undamped oscillatory processes occur in such bodies. These processes must be controlled by the control system. They are the orbitinduced and earth orientation-induced motions of the vehicle's own angular momentum vector relative to a line normal to the orbit, the direction of which coincides with the angular momentum of the orbit and also determines the average orientation of the vehicle axis directed towards earth. This motion, period of oscillations ($1/W_o$) of which is given by the orbit period is therefore also called orbit motion. Superimposed on the latter is the nutational motion, i.e., the motion of the body relative to its own spin axis direction, the period ($1/W_N$) of which depends on the magnitude of the bias angular momentum and on the moments of inertia of the transverse axes of the body In addition, one or two groups of weakly damped vibrational processes occur, such as, for instance, structural vibrations, the influence and vibrational frequency of which depends on the geometric, mass and elasticity properties of the structural elements used, or motions of liquids, such as any propellants carried along in primarily spherical and/or cylindrical tanks, the vibrational modes of which depend on the tank geometry and the properties of the liquids such as viscosity and surface tension All these vibrations are linked via their interaction with the vehicle and via the angular momentum coupling between the vehicle axes with each other.

If such a vehicle is to be stabilized with its three, generally mutually orthogonal axes relative to predetermined directions in space, or track the earth during its orbit with one of these three axes, it is generally also necessary to measure the deviations of all vehicle axes from the desired directions in space with the help of suitable sensors, preferably the earth and the sun, but also bright stars being utilized as reference objects For providing a three-axes reference for the vehicle orientation, two reference objects are normally necessary. For each of the objects, the vehicle orientation relative to two directions, orthogonal to each other and to the line connecting the two objects, can be measured. In the case of vehicles, which move in orbits around the earth, the deviations of a vehicle axis pointing toward the earth can be derived continuously from the earth as the reference object, for instance, by means of infrared sensors or RF sensors, in two mutually perpendicular directions, i.e., as two measurement values. The required third reference direction can be obtained from the sun as the reference object, for instance, by means of sun sensors, with the exception of these positions of the vehicle in its orbit around the earth, in which the sun, the earth and the satellite lie on one line, i.e., in which the two directions in space serving as reference coincide. In practice, the tendency of a body with spin to retain its direction in space has therefore long been used to stabilize satellites and space vehicles In particular, it is possible by these means to make do, over shorter or longer periods of time depending on the magnitude of the bias angular momentum with only two axes as reference, that is, with only the earth as reference object for measuring the attitude. The motion about a vehicle axis parallel to the spin vector is usually brought about within the orbit plane by the acceleration or deceleration of the angular momentum storage device relative to the despun part of the vehicle on the basis of the east/west deviation, measured by an infrared sensor, of the vehicle axis pointing to the earth and will not be considered further here.

The gyroscopic coupling between the transverse axes is now deliberately exploited to track or stabilize the two vehicle axes orthogonal to the spin axis by means of only one additional measurement signal, which detects the deviations perpendicular to the orbit plane of the vehicle axis pointing to the center of the earth. Control devices, known in this connection, usually consist of a sensing element, such as an infrared sensor, as well as a suitable controller network and a modulator, which generates pulse-shaped triggering signals for the final control elements, especially reaction jets, which are disposed so that they generate not only torques with respect to the one vehicle axis to be controlled, but at the same time also torque components of the opposite algebraic sign about the vehicle axis orthogonal thereto. As regulators or modulators, simple low-pass filters or lead/lag elements of the first order are usually used in conjunction with pseudorate (PR) or pulse width, pulse frequency (PWPF) modulators. In addition, such control devices must be equipped with a nutation-damping device, which ensures that a build-up of nutational oscillations or limit cycle oscillations, due to consecutive pulses initiated upon reaching a response threshold, cannot occur. The nutation-damping devices are based on the so-called Posicast principle, which states that basically undamped periodic processes, such as the nutation in the present case, can be stabilized by repeating an issued first discrete regulating intervention after a fixed time, preferably ranging from ⅜ to one half a period of the periodic process, with the same algebraic sign and the same energy content.

In spin-stabilized satellites which are characterized, because of the intrinsic rotation of the main vehicle body by a particularly large bias angular momentum additional control loops, which are separate from the control of the principal axis directions of the despun vehicle part, are generally used for the sole purpose of nutation damping. These control loops are equipped with sensors of their own, such as accelerometers for triggering the reaction jets rotating in this case with the rotating vehicle part. For orienting the vehicle axes with respect to the earth and more particularly for orienting the direction of the spin axis in space, commands are usually sent from the earth to the vehicle. The execution of these commands is triggered on board via (attitude) sensorcontrolled logic circuits.

In practice, the known devices have a number of serious shortcomings. First, a control of the type mentioned operates far from optimum, as far as the expenditure of setting energy required is concerned. This situation is due to the fact that regulating interventions are initiated in each case when the measured deviation from the reference direction just reaches a permissible threshold irrespective of whether the regulating intervention with respect to the nutational motion takes place at a favorable point in time, or at a particularly unfavorable point in time, that is, one that increases the nutational motion. This leads to the situation that, for reasons of assuring stability with respect to two-sided limit cycles, the threshold values for triggering regulating interventions must be chosen to be relatively large, i.e., at least equal to the maximum diameter of the nutation cone generated by a regulating pulse. This has an adverse effect on the accuracy of the tracking of the axis that is to be controlled Moreover, the effectiveness of the subsequent damping of the nutation is correspondingly uncertain and depends on the contingencies of the triggering instant of the first regulating intervention. This uncertainty region is further enlarged by the unavoidable fluctuations (of about 20% in system-related) parameters, such as the actually delivered "effective" regulating pulse, spin variations usually of ±10% in the permissible operating range, variations of the moments of inertia, measured-value noise and the like. Mainly, however, the known devices are not suitable for safeguarding at the same time the stability of additional, weakly damped vibrational processes, such as structural vibrations and propellant motions, especially if their frequencies do not differ enough from the nutational oscillations or their coupling to the vehicle is not weak enough, so that a mutual influence would be precluded. Because of the weak intrinsic damping of the said oscillation processes, an excitation is possible even via subharmonic regulatory interventions. In other cases, such as, for instance, in so-called spin-stabilized satellites, the nutation frequency, because of the large spin, is dangerously close to the range of vibrations of elastic deformations. A further disadvantage of the above-mentioned, known devices is that the control accuracy with respect to the second transverse axis of the vehicle, which is stabilized only indirectly via the angular momentum coupling, frequently does not meet the specified requirements. Its deviation from the desired angular position is determined almost exclusively by the magnitude of the stored spin, the externally acting disturbance torque acting about this axis and by the magnitude of the control error, which is permitted around the first, directly controlled vehicle axis and cannot be reduced arbitrarily for the stability reasons explained above.

It is an object of the present invention to provide devices for regulating a set value and for stabilizing the vibrations of an elastic body subject to spin and free to move about its axes of rotation, in particular of an aircraft and a space vehicle, with respect to two body axes lying transversely to the spin axis, by means of one or more position sensors measuring the deviations of the first and/or second transverse axis from their set directions, controllers and one or more final control elements generating regulating forces and/or torques about both transverse axes, said devices avoiding the shortcomings mentioned, that is, ensuring better utilization of the regulating energy, guaranteeing the stability of vibrational processes of elastic structures or moving liquids and making possible a higher control accuracy of the angular motion about both transverse axes.

According to a first embodiment of the invention, this is achieved by the fact that the regulating signal for set value control with respect to a first transverse axis, for stabilization with respect to a second transverse axis and for the simultaneous damping of vibrations about both axes can be obtained from a uniaxially measuring position sensor by means of a controller, the transfer function of which has a denominator greater than its enumerator by three orders of magnitude. Pursuant to the invention, the expenditure for an additional nutation-damping logic is unnecessary and, aside from saving regulatory energy about the nutation-damping pulses unavoidable in known devices of this type, the stability of all vibrational processes occurring in elastic vehicles is thereby assured at the same time.

In accordance with a second embodiment of the invention of a different kind, not only are savings of setting energy and the stability of structure-dynamic vibration processes assured, but a considerable improvement is also achieved in the control accuracy with respect to two vehicle axes orthogonal to the spin axis, even if only one uniaxial attitude sensor is used to control the transverse axes. This inventive control device is characterized by the feature that, from the measuring signal for the deviation of a first transverse axis, a signal component ($\phi_o$) representative of the orbital motion is obtainable from the measurement signal for the deviation of a first transverse axis via a first controller network and a signal component ($\phi_N$) representative of the nutational motion is obtainable via a second controller network, it being possible to link the two networks in a nutation controller in such a manner that, after passing through an angular momentum controller, a dead-zone element and a modulator network, the logical decision concerning the need for, the algebraic sign of and the duration of a regulating intervention can be made by means of the first signal component ($\phi_o$) representing the orbital motion and, after the signal is processed in a differentiating section, a nutation observer and an amplitude/phase converter, the time for the regulating intervention within a nutation period can be fixed with the help of the second signal component ($\phi_N$) representing the nutational motion. In further, extremely advantageous embodiments of the second inventive concept, the two transverse axes of a body subject to spin, especially a satellite, which are othogonal to the spin axis and to one another, are controlled in an energy-wise optimum manner and the stability of all the weakly damped vibrational processes described are controlled in a safeguarding manner with the least possible error with respect to the given set directions with the help of additional measurement values such as the instantaneous magnitude of the bias angular momentum as well as an additional measurement signal, which represents the attitude error of the second transverse axis and which is obtainable either only intermittently or also continuously, for example, via sun sensors.

The inventive control devices will be explained in the following for a three-axis-stabilized satellite on a geosynchronous orbit, starting from the state of the art and referring to embodiments shown in the drawings. However, they are equally suitable for spin-stabilized satellites. In the drawings:

FIG. 1b shows a typical arrangement, suitable for the present case, of control components in the satellite of FIG. 1a.

FIG. 1c shows another arrangement, of measuring elements in a satellite of the mentioned kind.

FIGS. 6c, 6d show different advantageous embodiments of the inventive device based on the principle of FIG. 6b.

Figure 5A:
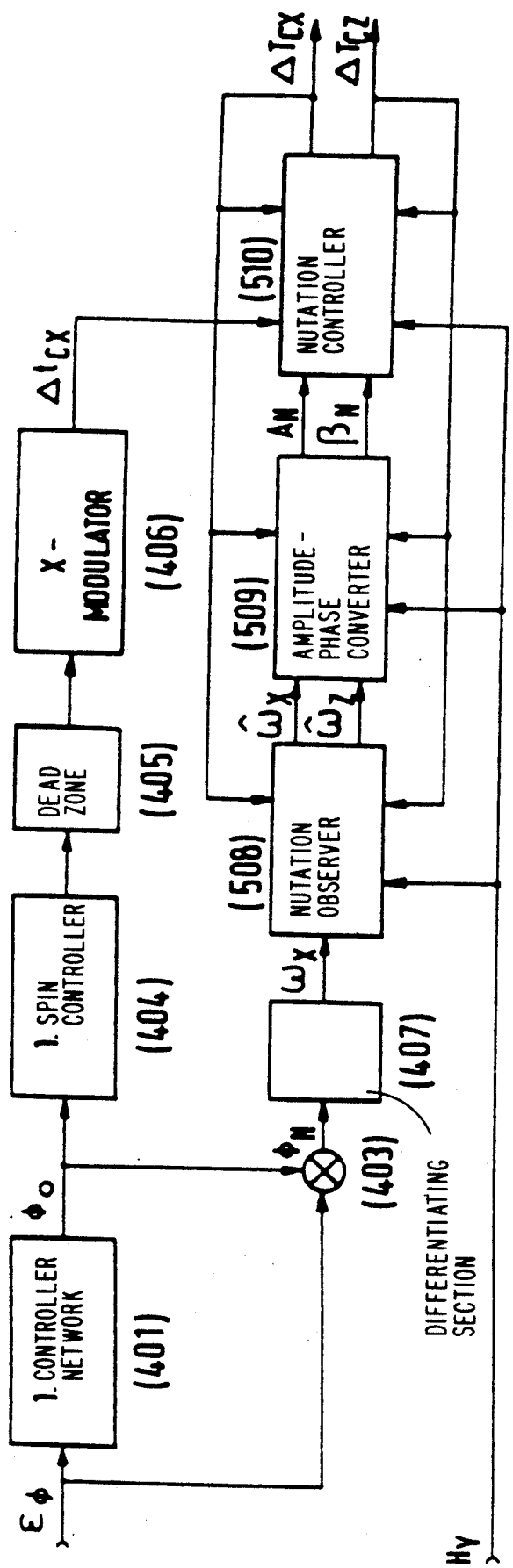
FIG. 5a shows the functional schematic diagram of an improved inventive control device, which can be adapted to variable system parameters.
Figure 5B:
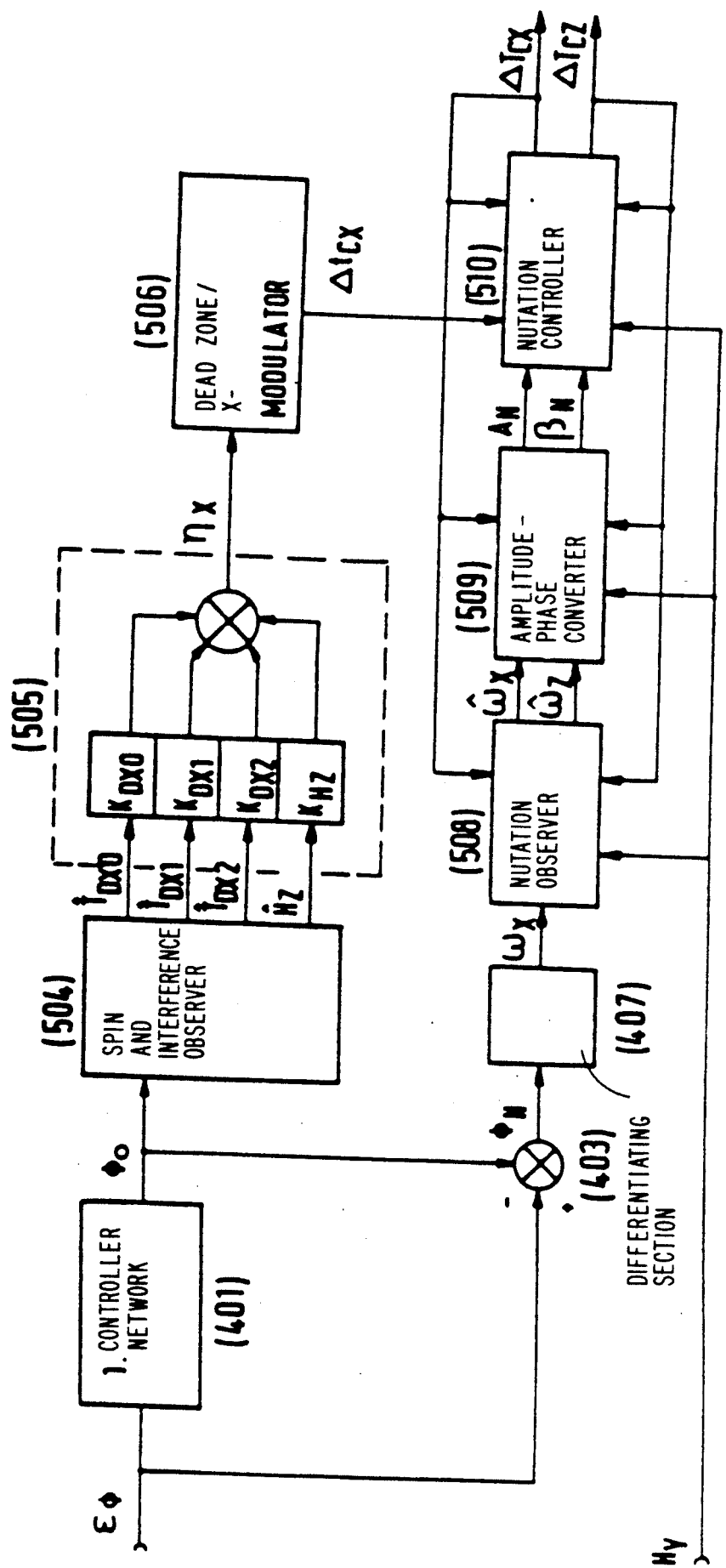
FIG. 5b shows the functional schematic diagram of a control device improved by compensation of the observable interference with respect to its orientation accuracy
Figure 5C:
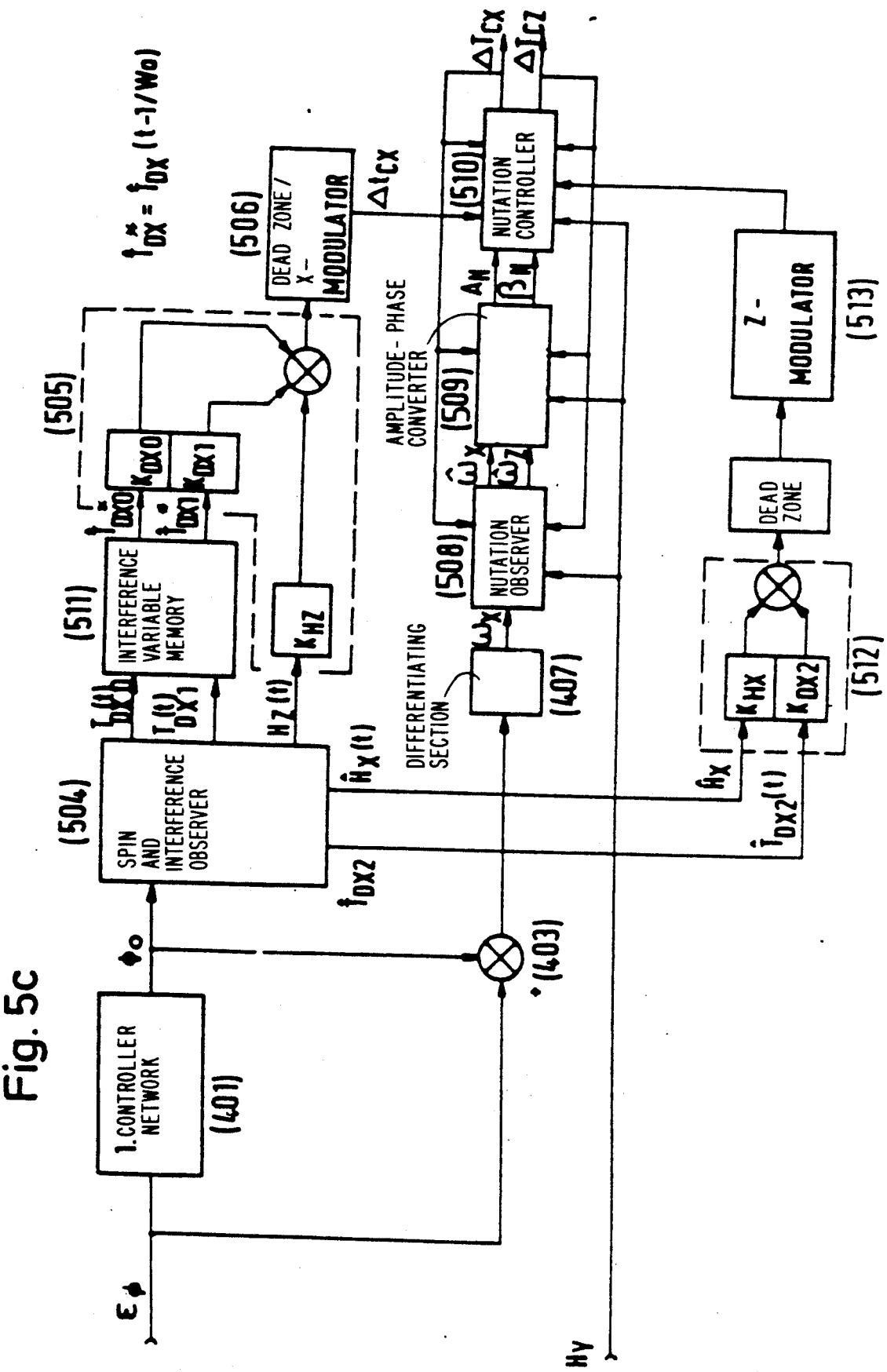
FIG. 5c shows a different expanded embodiment of the device of FIG. 5b.

Table 1: a tabular listing of the instructions for generating regulating interventions in an embodiment of the invention according to FIG. 5c.

Table 2: A tabular listing of the inventive instructions for generating regulating interventions in devices according to FIG. 6a.

Figure 1A:
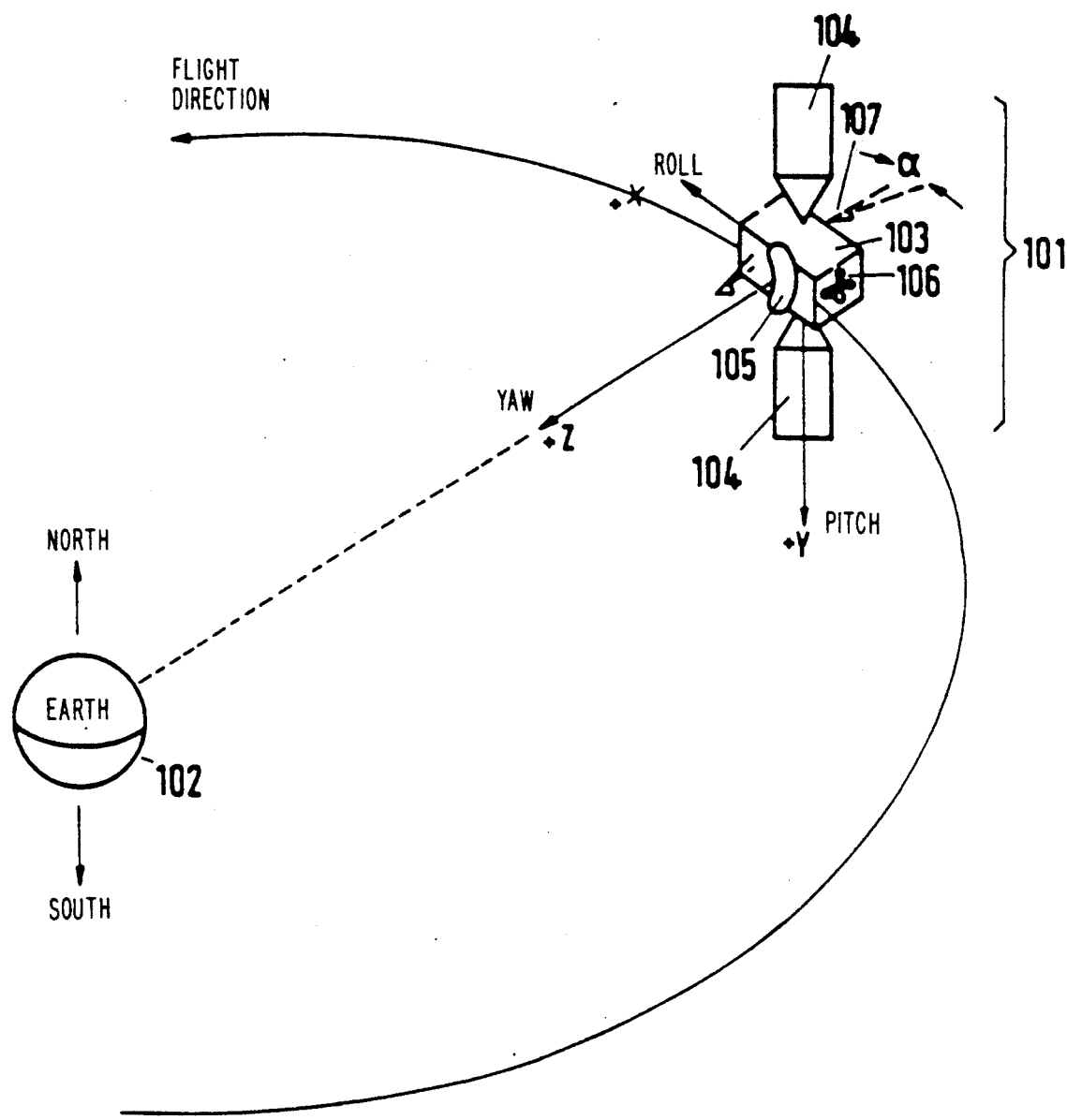
FIG. 1a shows the axis designations and set orientation of a three-axis-stabilized satellite on an equatorial orbit around the earth.

FIG. 1a shows, greatly simplified, the typical geometric configuration of a three-axis-stabilized geostationary communication satellite (101) on its orbit around the earth (102). The space vehicle (101) consists of a cubical central body (103), in which large-area flexurally elastic solar generators (104) are rotatably supported and which carries one or more antennas (105) aligned to the earth (102), the radiation direction of which is to be retained within given narrow limits with the help of the control system of the space vehicle (101). Associated with the space vehicle (101) is an axis system. x (roll axis), y (pitch axis), z (yaw axis) such that, in case of ideal operation of the control system, the roll axis points in the instantaneous direction of flight, the yaw axis to the center of the earth and the pitch axis in the direction of the normal to the orbit. Reaction jets (106, 107) which are disposed on different sides, are shown only schematically and to the extent visible in this presentation and serve to generate torque about these axes. In particular, the reaction jets (107) generating the roll torques are disposed by installation at an angle ($\alpha$) in such a manner, that they generate upon activation roll torques and, simultaneously, yaw-torque components of opposite algebraic sign from the roll torque.

In normal operation of the space vehicle (101), interfering torques occur primarily due to solar pressure, residual magnetism of the space vehicle in interaction with the earth's magnetic field, as well as inhomogeneities of the gravitational field of the earth (102), which take the directions of the axes of the space vehicle (101) away from their set position. This must be prevented by intervention of the control system.

Figure 1B:
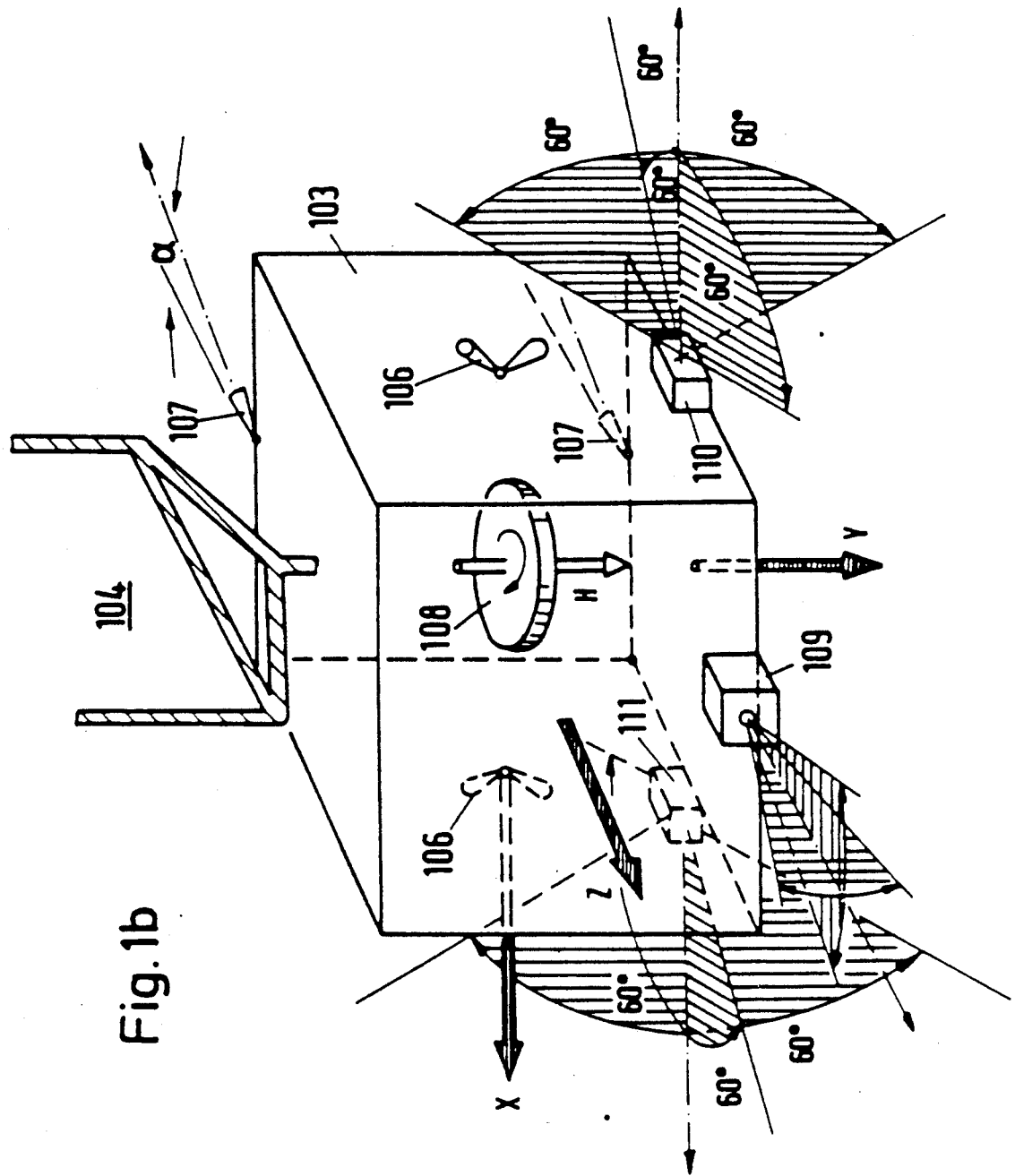

FIG. 1b, in a likewise greatly simplified perspective view, shows a typical arrangement of control components as far as they are of significance to the present invention. These components are usually disposed at the central body (103) of the space vehicle and consist, aside from the reaction jets (106, 107) generating predominantly roll torques and yaw torques of a bias angular momentum storage device, for instance, a so-called fly-wheel (108) driven by an electric motor and rotating about its associated spin axis (coincident with its angular momentum vector H), measuring sensors (109, 110, 111) which determine deviations of the vehicle axes from their set direction relative to reference objects such as the earth by an infrared sensor (109) or the sun by sun sensors (110, 111). If the z (yaw) axis of such a space vehicle always remains aligned towards the earth, an infrared sensor (109), if suitably disposed, furnishes measurement signals for angular motions about the x (roll) axis and the y (pitch) axis. Of these, however, only the roll angle measurement will be considered in the present case. Angular motions about the yaw axis pointing towards the earth can be determined by means of sun sensors (110) pointing in the ±x axis direction in such sections of an orbit around the earth, in which the sun is in their field of view. For the sensors with a ±60° field of view indicated in FIG. 1b, this is the case for twice one-third of the orbiting period. If, on the other hand, the sun is in the ±30°-wide sectors between the fields of view of the above-mentioned sun sensor, then no yaw information is available in the example of FIG. 1b. In these regions, however, the quality of a yaw measurement with sun sensors is limited considerably anyhow and is completely impossible in the region of collinearity of the sun, the earth and the satellite.

FIG. 1c shows another possible arrangement of measuring elements in a three-axis-stabilized satellite in a likewise greatly simplified schematic representation and in another perspective. In this case, sun sensors (112, 113, 114) with fields of view of ±60° about their direction of installation are disposed so that they can furnish measurement values with the sun in any position around the vehicle. By these means, the sector of unavailable yaw information can be reduced substantially relative to an arrangement of FIG. 1b without any fundamental change in the above-discussed basic geometric limitation in the region of collinearity of the directions of view to the earth and the sun.

Figure 2:
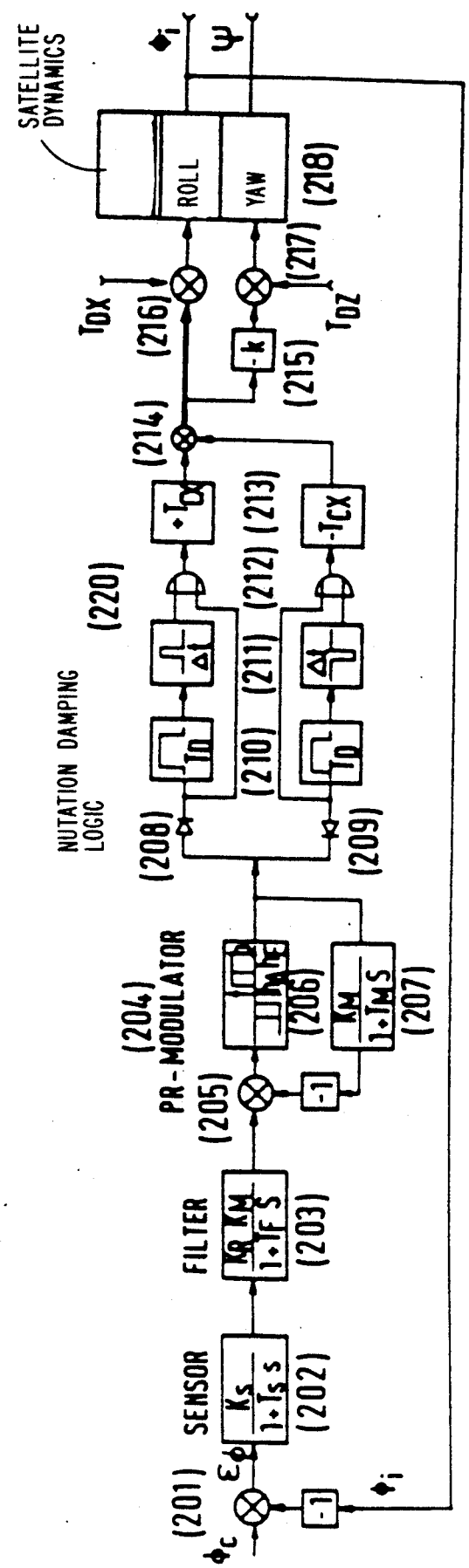
FIG. 2 shows the block diagram of a control circuit of conventional design

FIG. 2 shows a basic block diagram of a control circuit of conventional design for the control of the set value of a first transverse axis orthogonal to the spin direction, in this case, the roll axis, and for the simultaneous stabilization about a second transverse axis, in this case, the yaw axis of such a satellite, by means of only one attitude sensor (202) measuring the deviation ($\epsilon_\phi$) of the first transverse axis for its desired set direction. The deviation ($\epsilon_\phi$) of the direction ($\phi_i$) of the first transverse axis from its set orientation ($\phi_c$) is determined by an attitude sensor (202), the dynamic properties of which are indicated in simplified manner by a first-order time-lag element with a lag time constant ($T_s$) and a gain ($K_s$). In general, the dynamics of the measurement process are fast enough, i.e., the time constant ($T_s$) representing the dynamics is small enough, so that it does not interfere with the control process and can therefore be disregarded. In the case of FIG. 2, only a first-order filter (203) with a time constant ($T_F$) and a gain ($K_R K_M$) is provided as the controller network, the output signal of which is fed to a pseudo rate (PR) modulator (204) which consists of a summing element (205), a relay characteristic (206) and a feedback network (207) and has the task of converting the controller output signals fed to it into a sequence of triggering pulses of the correct algebraic sign, which are, on the average, equivalent to the controller output signals, for the reaction jets generating the control torque. Instead of time-lag elements as controller networks in conjunction with PR modulators, lead/lag elements together with pulse width/pulse frequency (PWPF) modulators are employed in known and functionally completely equivalent control devices. The modulator output pulses are fed to the reaction jets via a nutation damping device which, as already mentioned, repeats each primary regulating pulse delivered by the modulator after three-eighths to one-half the duration of the nutation period with the same algebraic sign, provided that no further primary pulses of the same sense have been supplied by the modulator in the meantime. Functionally, such a nutation damping device therefore consists, for instance, as indicated in FIG. 2, of logical OR gates (212), to which each modulator pulse is supplied in parallel branches, on the one hand directly and, on the other, via time counters (210) for the delay time ($T_D$) and individual pulse generators (211) are supplied for generating the nutation damping pulses with a predetermined pulse duration ($\Delta_t$). The output signals of logical OR gates (212) drive the valves of, the corresponding reaction jets (213) for generating the control torques ($T_{cx}$). The algebraic sign separation of the driving pulses generated by the modulator is shown schematically by appropriately poled diodes (208, 209). The sum of the setting torques ($\pm T_{cx}$) so generated formed in FIG. 2 by a summing element (214) acts on the dynamic motion of the satellite, coupled via the spin, about its two transverse axes. Due to the oblique installation (angle $\alpha$) of the reaction jets, which were described in connection with FIG. 1b, no only do regulating interventions ($T_{cx}$) act on the first transverse axis, the roll axis of the satellite, but at the same time also torque components of the opposite algebraic sign ($-k$, $|k|<<1$) are generated about a second transverse axis, the yaw axis. Utilizing the angular momentum coupling, this brings about a stabilization of the second transverse axis in known fashion. As an adjustment rule for the controller parameters of such a coupled roll/yaw control according to the well known so-called WHECON principle, the following applies:

$$T_F < \frac{\tg\alpha}{W_o} \tag{1a}$$

$$3/8\ T_N \leq T_D \leq 1/2\ T_N \tag{1b}$$

$$\frac{1}{T_N} = W_N = \frac{H_y}{\sqrt{I_x I_z}} \tag{1c}$$

in which $\alpha$— is the oblique angle of installation of the final control elements which predominantly generates roll torques, $W_o$— is the angular frequency of the orbital period of the vehicle, for instance, $7.27\times10^{-5}$ (1/sec) for geostationary satellites $T_F$— is the controller time constant (FIG. 2)

$T_D$— is the delay time of the nutation damping pulse relative to the primary pulse $T_N=1/W_N$— the nutation period, $H_y$— is the bias angular momentum, $I_x$, $I_z$— are the transverse moments of inertia of the vehicle.

It was already explained elsewhere that a control circuit of the above-described known kind admittedly is capable of damping the orbiting motion and, for nominal values of the system parameters, of damping nutation vibrations. However, it requires a large amount of setting energy for the nutation damping, becomes largely ineffective in its nutation damping behavior in the event that parameters deviate from their nominal values, and is not suitable for simultaneously also controlling other vibrational processes in the system, for instance, those stemming from structure elasticities and propellant motions.

Figure 3:
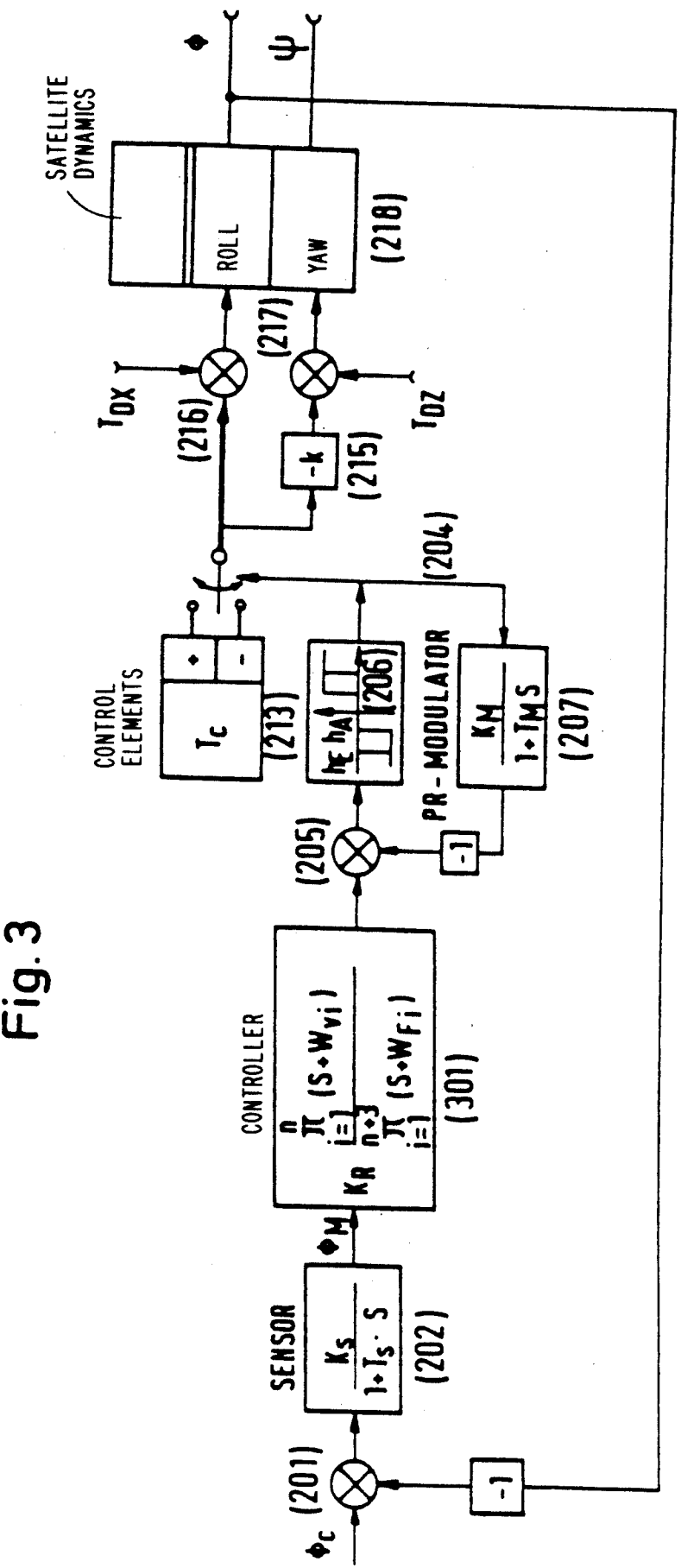
FIG. 3 shows an improved control device in accordance with a first embodiment of the invention.

FIG. 3 shows an improved control device according to a first embodiment of the invention which, due to a special structure of the controller transfer function, makes it unnecessary to install an additional nutation damping device, is distinguished by great insensitivity to system-related parameter fluctuations and by requiring a minimum amount of setting energy and, in addition, assures the stability of additional, weakly damped vibrational processes. Pursuant to the invention, this is accomplished by a controller network, the transfer function of which has a denominator polynomial three orders higher than its numerator polynomial. In the simplest case, for instance, if a PR modulator is used, a controller of the following form should therefore be provided $$\frac{K_R}{(S + W_{F1})(S + W_{F2})(S + W_{F3})} \tag{2a}$$

If a PWPF modulator is used and the already mentioned equivalency conditions are observed, at least one controller with a transfer function of the following structure is required:

$$\frac{K_R (S + W_{V1})}{(S + W_{F1})(S + W_{F2})(S + W_{F3})(S + W_{F4})} \tag{2b}$$

In a generally applicable, shorter product representation of FIG. 3, the controller transfer function according to the feature of main claim 1 must have the form:

$$K_R \cdot \frac{\prod_{i=1}^{n} (S + W_{Vi})}{\prod_{i=1}^{n+3} (S + W_{Fi})} \tag{2c}$$

in which $K_R$— is the controller gain $W_{Fi}$— are the angular frequencies of the (n+3) controller poles (i=1 ... n+3)

$W_{Vi}$— are the angular frequencies of the (n) controller zeros (i=1 ... n) and $$\text{and } \prod_{i=1}^{n} (.) -$$

are products of (n) factors of the form given

S— the Laplace variable

In practice, the minimum structures of the controller transfer functions according to equations (2a) and (2b) frequently furnish damping of the nutation vibration, which still is too little. It is therefore advisable to increase the enumerator and denominator terms equally by at least one order.

As is well known, increasing the order of the numerator polynomial is also accompanied by a worsening of the signal-to-noise ratio in the control loop. However, nonlinear simply and doubly adaptive frequency range filters have already been developed, which are distinguished by particularly small phase losses in the passband and a steep decay slope toward the cutoff region and can be combined in connection with the inventive control devices present here in a most advantageous manner if this should become necessary.

Depending on the application, the pole and zero frequencies ($W_{Fi}, W_{Vi}$) can be real, in which case they correspond to the reciprocal values of the controller time constants, or also conjugated complex in pairs, in which case such pairs can be combined in second-order transfer elements with damping coefficients smaller than 1. This controller structure also contains the special case of an integral controller, if one of the pole frequencies is chosen to be equal to zero. Since integral controllers generally require special measures for the adjustment of their starting conditions, it is advisable for the realization of such networks to realize the integral portion as a parallel circuit. The transformation of the controller transfer functions (Equations 2a to 2c) by expansion into partial fractions for splitting off the integral portion is familiar to anyone skilled in the art. If, according to generally known rules or project-specific requirements, the dynamic relationships and stability conditions require a correction of higher order than 1 (Equation 2b) i.e., additional zeros of the controller transfer function, the denominator also must be expanded by correspondingly many terms, according to the invention.

In some cases, especially in spin-stabilized satellites, it may happen that, due to a relatively high nutation frequency, the dominant sensor time constant is no longer negligible; instead, it lies in the dynamic range of the controller bandwidth. This is then practically equivalent to an additional pole of the controller transfer function. It is obvious that the attitude sensor must then be regarded as part of the controller transfer function and must be taken into consideration when realizing the inventive instructions. The same considerations apply for the inclusion of the modulator delay ($T_M$), when PWPF modulators are employed. For choosing the parameters of the inventive controller, the generally applicable adjustment rules, known to any expert, must be observed for the amplitude and phase balance in the closed control loop, i.e., for the transfer function ($Y_o(jw)$) of the entire open loop including the dynamics of the controlled system $$Y_o(jW) = \frac{Z(jW)}{N(jW)} \tag{2d}$$

at the so-called gain cross-over ($W_{co}$) which is defined by the condition $$|Y_o(jW_{co})| = 1 \tag{2e}$$

the phase relation
$$\arg Z(jW_{co}) - a > \arg N(jW_{co}) \tag{2f}$$

must apply, in which argZ, argN represent the phase angles of the enumerator (Z) and denominator term (N) respectively, and α represents the oblique angle of installation of the final control element.

Since the gain cross-over frequency ($W_{co}$) and the nutation frequency ($W_N$) practically coincide because of the steep slope of the amplitude curve, the simplified condition:

$$\operatorname{arctg}\left[W_N \cdot \sum_{i=1}^{n} \frac{1}{W_{Vi}}\right] > \operatorname{arctg}\left[W_N \cdot \frac{1}{W_{Fi}}\right] + a \tag{2g}$$

can be derived from Equation 2f in the case of real pole and zero frequencies with a useful approximation for the controller transfer function. In every case, the requirements with regard to the command control and stabilization of elastic bodies having stored angular momentum can be met in an energywise optimum manner with an inventive controller structure by shifting, depending on the location of the resonance frequencies of the body to be controlled, the corresponding undamped or very weakly damped vibration processes into one of the three known stability regions in which, at a loop gain of $$|Y_o(jW)| \geqq 1 \qquad (2h)$$

stability is ensured by a phase lead of
$$-180° < \arg Y_o(jW) < +180° \qquad (2i)$$

or by phase delay of
$$-540° < \arg Y_o(jW) < -180° \qquad (2k)$$

or by lowering the loop again, the condition
$$|Y_o(jW)| < 1 \qquad (2l)$$

Devices of the type described above in connection with FIG. 3 represent not only a simplification in realization due to the elimination of previously required nutation damping devices, but also a considerable improvement over the state of the art, especially with respect to setting energy requirements and the management of all the vibration problems mentioned. However, in practical application, they are still subject to considerable limitations, if specially stringent requirements as to the orientation accuracy of the said body axes transverse to the spin axes must be met, especially if the regulating interventions take place in discrete form, which cannot fall below certain minimum pulse increments, as was assumed in the examples considered. It has already been mentioned that, if only one position sensor measures the deviation of a first transverse axis from its set direction, the orientation accuracy about a second transverse axis simultaneously stabilized using angular momentum coupling, depends on the tracking error about the first transverse axis and, for a given angular momentum, primarily on the magnitude of the disturbance torque about the second transverse axis. In satellites of this kind, the typical orientation accuracy about the second transverse axes is 4 to 10 times worse than that about the first directly controlled vehicle axis. The orientation error about the first transverse axes is determined by the effective dead zone provided there and, to avoid impermissible limiting cycle vibrations, must always be chosen to be somewhat larger than the diameter of the nutation cone, which can occur under the most unfavorable conditions due to a discrete regulating intervention, such as, a minimum pulse of the reaction jets. This error is transformed over the coupling of the axes with a certain amplification into the second transverse axis also as an unavoidable inaccuracy.

A further object of the present invention is to provide devices for improving the orientation accuracy about both transverse axes while retaining the already described advantages of the invention of the first kind An arrangement of a completely different kind is the starting point for solving the stated problem In the following, the advantageous, already described specific controller structures are included in this invention of the second kind Within the scope of further embodiments of this further inventive concept, the orientation accuracy about both transverse axes is finally improved step by step until the most stringent requirements are met, while optimally utilizing information, measured values and intervention possibilities available on board such space vehicles anyhow, i.e., without additional costs for control components.

Figure 4A:
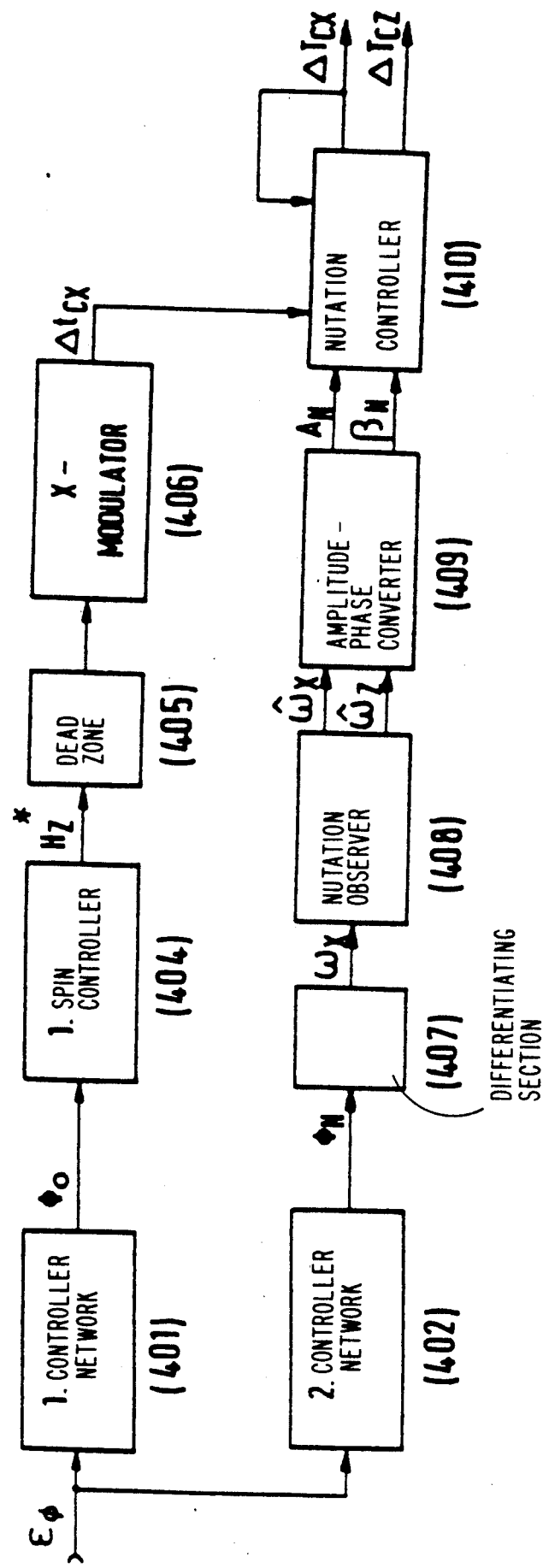
FIG. 4a shows the block diagram of a second embodiment of the invention of a different type.

FIG. 4a shows the basic block diagram of a control device of the second kind which, pursuant to the invention, is characterized by the feature that, from the measurement signal for the deviation ($\epsilon_\phi$) of a first transverse axis from its set direction, a signal component ($\phi_o$) representative of the orbital motion can be obtained via a first controller network (401) and a signal component ($\phi_N$) representative of the nutation motion can be obtained via a second controller network (402). The two signal components can be linked in a nutation controller (410) in such a manner, that by means of the first signal component ($\phi_o$) representing the orbital motion, after it has passed through an angular momentum controller (404), a dead zone member (405) and a modulator network (406), the logical decision regarding the need for a regulating intervention, the algebraic sign and duration ($\Delta t_{cx}$) of the intervention can be made and, by means of the second signal component ($\phi_N$) representing the nutational motion, after signal updating in a differentiation section (407), a nutation observer (408) and an amplitude/phase converter (409), the time for the regulating intervention within a nutation period can be fixed.

Lowpass filters of the first to the fourth order serve to separate the orbital motion component ($\phi_o$) in the first controller network (401). The signal components ($\phi_N$), representative of nutation and motion processes of higher frequency, are obtained from the measurement signal via the second controller network (402) with high-pass characteristics. It is obvious that, for the intended separation of the signal components, the cut-off frequencies of both networks must lie between the orbiting frequency of the vehicle and its nutation frequency and, in particular can be chosen to be equal.

Figure 4B:
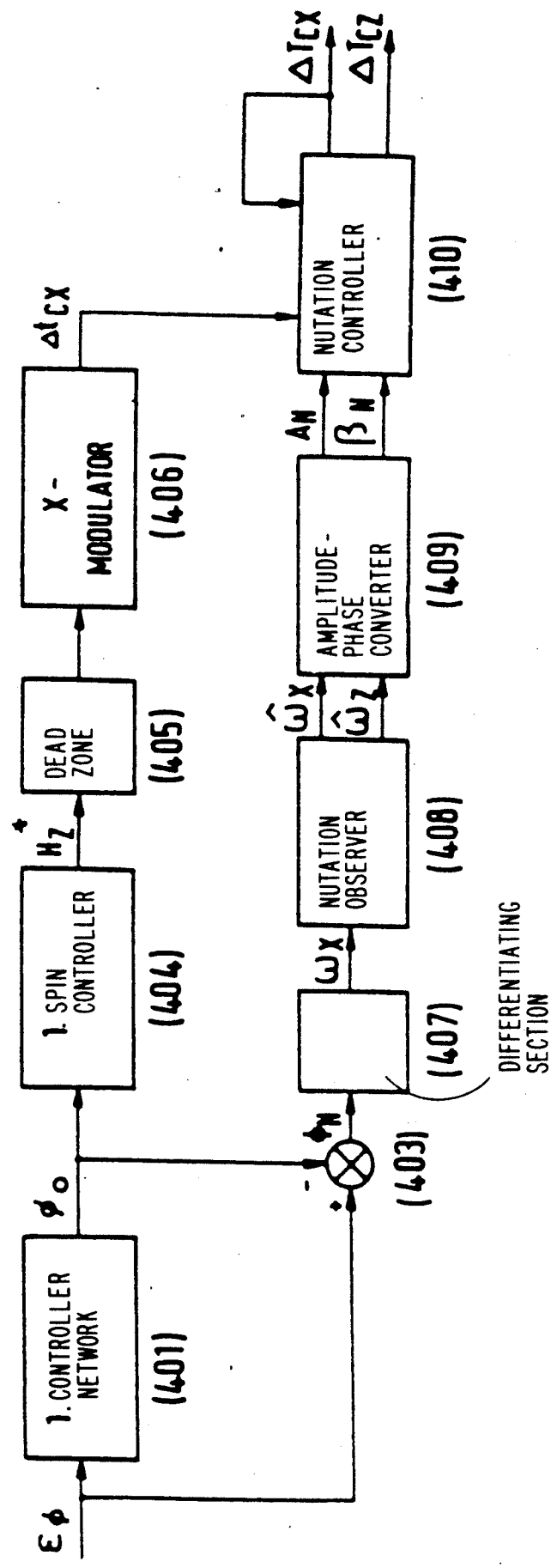
FIG. 4b shows a simplification of the control arrangement of FIG. 4a for better realization.

Therefore, as is shown in FIG. 4b, it is usually sufficient in practice to realize only the first controller network (401) mentioned and to subtract the signal component for the orbital motion of the vehicle formed thereby at a summing point (403) from the measurement signal ($\epsilon_\phi$) to form the nutation oscillation signal ($\phi_N$). If the controller networks (401, 402) are realized separately, the second controller network (402) can optionally be realized as a bandpass for suppressing possibly undesired signal components of higher frequency superimposed on the nutation oscillation. The signal ($\phi_o$), obtained in the first controller network (401) for the orbital motion component about the first transverse axis, the roll axis of the vehicle under consideration, is approximately proportional to the angular momentum or the spin component ($H_Z$) in the direction of the second transverse axis of the vehicle, here the yaw axis, with the angular momentum ($H_y$) stored in the vehicle as the proportionality factor.

The angular momentum controller (404) in the FIGS. (4a, 4b) consists in the simplest case of a gain factor with dimensions. To improve the stability and motion dynamics, however, lead/lag elements can be employed additionally. Preferably, the elements are of the first or second order, or complete or also reduced estimation algorithms, which are formed according to known rules of observer theory. Then algorithms are used, for instance, to estimate only one spin component, for one ($H_Z$) or both transverse axis components of the vehicle angular momentum, ($H_z$, $H_x$). Alternatively, electric networks equivalent to such observers are used. A particularly advantageous combination of a first controller network (401) and an angular momentum controller (404) is obtained if, for the overall transfer function, the features of the controller structure of the already described invention of the first kind are met, i.e., a third-order lowpass as the first controller network (401) in conjunction with a constant or PD stages as angular momentum controllers (404). Pursuant to a further embodiment of the inventive concept, integral components are furthermore suitable in the transfer function of the angular momentum controller (404). These then form a measure for estimated values of constant disturbance torque components, the compensation of which contributes to increasing the accuracy. The estimation of and compensation for disturbance variables will be discussed in detail later.

The equations for a complete observer of the angular momentum components are:

$$\begin{bmatrix} \hat{H}_x \\ \hat{H}_z \end{bmatrix} = \begin{bmatrix} 0 & W_o \\ -W_o & 0 \end{bmatrix} \cdot \begin{bmatrix} \hat{H}_x \\ \hat{H}_z \end{bmatrix} + \begin{bmatrix} K_{11} \\ K_{21} \end{bmatrix} (H_y \phi_o - \hat{H}_z) + \begin{bmatrix} T_{cx} \\ T_{cz} \end{bmatrix} + \begin{bmatrix} T_{Dx} \\ T_{Dz} \end{bmatrix} \quad (3a)$$

wherein
$W_o$ — is the frequency of the orbiting motion
$H_z, H_x$ — are the estimated values for the spin components ($H_x$, $H_z$) in the direction of the transverse vehicle axes (z, x axes) transformed into an imaginary orbit coordinate system carried along with the center of gravity of the vehicle
$K_{11}, K_{21}$ — are gain factors
$H_y$ — is the stored vehicle angular momentum
$\phi_o$ — is the representative measuring signal portion for the component of the orbit motion about the first transverse vehicle axis (roll axis)
$T_{cx}, T_{cz}$ — are setting torques
$T_{Dx}, T_{Dz}$ — are interference torques.

For the steady-state condition of the control loop considered first, the setting and interference torque terms can be ignored, because they then cancel each other on the average. Their influence will be discussed later.

With the execution of such instructions, estimated values for the angular momentum components in the direction of the second ($H_z$) as well as the first transverse vehicle axis ($H_x$) can be determined, as shown by equation (3a). Since the angular momentum components in the direction of the second transverse axes ($H_Z$) can be obtained in good approximation from the output signal of the first controller network via the proportionality factor ($H_y$) mentioned, a simplified observer can serve in particular, for obtaining a measure of the first transverse axis component ($H_x$). Such a simplified observer can be represented by a simple transfer function with a first-order numerator term and a second order denominator term. Reference will be made to its use in a further embodiment of the invention, which will be described later. For the time being, only an estimated value for the angular momentum component ($\hat{H}_Z$) in the direction of the second transverse vehicle axis is of interest.

Realizing the observer equation (3a) as a computing algorithm in programmable digital onboard electronic circuitry presents no difficulties to one of skill in the art. Conversion into equivalent analog networks may present problems in practice because of the extremely slow motions and the unavoidable amplifier drift.

The dead zone (405) in the angular momentum control branch of the invention control device is acted upon by the output signal of the angular momentum controller and furnishes an output signal only if predetermined threshold values (for instance, $\pm d$) are exceeded. At this point, the advantage of the inventive control device of the second kind already became apparent inasmuch as the response thresholds of the dead zone member can be chosen to be substantially smaller than in conventional systems due to the lack of superimposed nutation oscillations. This substantially improves the orientation accuracy of the first transverse vehicle axis and consequently also reduces the corresponding error portion transformed into the second transverse axis. In the present case, the initiation of a regulating intervention is made dependent not on the instantaneous deviation measured by the sensor, but on whether the deviation of the angular momentum vector from its intended direction exceeds a predetermined amount.

The modulator (406), which has the function, when discontinuously operating final control members such as reaction jets are used, of converting the deviation signal into an equivalent sequence of control pulses, can be designed in the manner already described as a PWPF or PR modulator (FIG. 2). Since the phase relationship of the pulses generated by the modulator is not very important in the present case, as will be explained later, more simply realizable circuits such as pulse width modulators can also be employed. Since such modulators (for instance, 204 in FIG. 2), already contain a response threshold ($h_E$ in FIG. 2), it is not only advisable, but necessary for meeting the accuracy requirements, to link the threshold values of the dead zone section (405) and of the modulator (406). For example, a simple embodiment of such a modulator, which is very appropriate for the present invention, provides that, when a first response threshold ($\pm d_1$) is exceeded, the repetition frequency of predetermined, physically realizable minimum pulses is increased proportionally to the input signal and when a second response threshold ($\pm d \leq, |d \leq| > |d_1|$) is exceeded with the maximum permissible frequency of the repetition rate held constant, the pulse duration is increased proportionally to the input signal and specifically such that the generated pulse-time areas increase linearly, on the average, with the input signal.

The signal ($\phi_N$), representative of the nutational motion, which is formed from the measured signal via a second controller network (FIG. 4a) or via a first controller network in conjunction with a summing element (403), is fed in the inventive arrangement to a differentiating section (407), for instance, with the transfer function $$\frac{T_H \cdot S}{1 + T_H \cdot S} \quad (3b)$$

by which means a measure for the angular velocity ($W_x$) about the measured vehicle axis (roll axis) is formed from the angular motion ($\phi_N$). The downstream nutation observer (408) serves to form from the component of the nutational motion about the first transverse axis ($W_x$), which is based on measurement and differentiation, estimated values for the complete nutational dynamics via a model of the physical process, i.e., to supplement the oscillation component ($W_z$) about the second transverse vehicle axis, which is not measured directly. Instead of a second order nutation observer, once again simplified observers (for $W_z$) or equivalent networks can be employed in the conventional manner. For an embodiment of the first and second controller network of FIG. 4b, particularly supplemental filters for eliminating undesired signal components of higher frequency can be combined with the observer (408) and/or the differentiation section (407) to form a corresponding overall transfer behavior. The equations for the complete nutation observer are as follows:

$$\begin{bmatrix} \dot{\hat{W}}_x \\ \dot{\hat{W}}_z \end{bmatrix} = \begin{bmatrix} 0 & -\frac{1}{I_x}[(I_y - I_z)W_o - H_y] \\ -\frac{1}{I_z}[(I_x - I_y)W_o + H_y] & 0 \end{bmatrix} \begin{bmatrix} \hat{W}_x \\ \hat{W}_z \end{bmatrix} + \begin{bmatrix} k_1 \\ k_2 \end{bmatrix}(W_x - \hat{W}_x) + \begin{bmatrix} \frac{1}{I_x} T_{cx} \\ \frac{1}{I_z} T_{cz} \end{bmatrix} \quad (3c)$$

wherein
$\hat{W}_x, \hat{W}_z$ — are the estimated values of the angular velocities ($W_x, W_z$) about the x or z vehicle axis
$I_x, I_z$ — are the moments of inertia of the vehicle about the corresponding axes
$T_{cx}, T_{cz}$ — are the control torques about the respective vehicle axes
$K_1, K_2$ — are the gain factors
$H_y$ — is the bias angular momentum in the vehicle
$W_o$ — is the orbit frequency
and dots above the respective variables indicate derivatives with respect to time. Any expert is familiar with the realization of such observers through suitable algorithms in a digital on-board computer and with their conversion into equivalent transfer functions and analog circuits. The terms in the equations (3c), which are multiplied by the very small numerical value of the orbiting frequency, are basically negligible and are given here only for the sake of completeness. The freely selectable gain coefficients ($k_1, k_2$) should be chosen so that the observer hunts to steady state in a shorter time, for instance, half the duration of a nutation period.

At this point it is pointed out expressly that the formation of the angular velocity components ($W_x, W_z$) for the nutational motion from a measurement signal for the deviation ($\epsilon_\phi$) of a first transverse axis from its set direction via first and second controller network (401, 402) according to FIG. 4a or, as a substitute, by a suitable arrangement according to FIG. 4b via a first controller network (401) and forming the difference at a summing point (403) with a following differentiating section (407) are not necessary if a measurement signal for the motion variable ($W_x$) of the nutation vibration is directly available via additional sources such as rate gyroscopes, possibly in conjunction with highpass filters for eliminating the orbital motion component ($W_o$). If in addition measurement signals for the angular velocities ($W_x, W_z$) about both transverse vehicle axes are present, then these measurement values are advantageously used directly, whereby the nutation observer is then likewise replaced In the past, the use of such gyroscope equipment for extended-time missions has been impossible primarily for reliability reasons in normal mode control even when such equipment was available anyhow on board space vehicles for performing other operational phases, for instance, acquisition maneuvers The technological advance in the field of laser and glass fiber gyroscopes which, in contrast to the corresponding classical electromechanical components, contain hardly any or no mechanically moving parts at all, leads to the expectation of a considerable increase in the reliability and also a reduction in the costs of gyroscope equipment in the future This makes their use possible in the inventive devices not only for short but also over long periods of time. The present invention is thereby not limited to the use of only a single discriminating element per vehicle axis in conjunction with the described electrical circuits, networks or algorithms for forming the necessary signal components, but can generally be realized in a simpler manner with the aid of suitable additional measurement values This applies likewise also in the further description of the invention, even if reference is not made specially to such possibilities on every occasion.

In an amplitude-phase converter (409), variables ($A_N, \beta_N$) are formed, as shown in FIGS. (4a)(4b), from the estimated components ($\hat{W}_x, \hat{W}_z$), which correspond to the nutation amplitude ($A_N$) or the phase angle of the angular velocity of the nutation vibration ($\beta_N$). This can be accomplished simply by a Cartesian-polar coordinate transformation according to the rule:

$$A_N = \sqrt{\hat{W}_x^2 + \hat{W}_z^2} \quad (3d)$$

$$\beta_N = \text{arctg} \frac{\hat{W}_z}{\hat{W}_x} \quad (3e)$$

In vehicles, the transverse-axis moments of inertia of which ($I_x, I_z$) differ only slightly, as is the case practically always in spin-stabilized vehicles and frequently in three-axis-stabilized vehicles, particularly communication satellites, these relationships represent sufficiently good approximations. If the transverse-axis moments of inertia are different, then it is advantageous pursuant to the invention, to determine the nutation amplitude ($A_N$) from a formula, which takes these relationships into consideration and has the form $$A_N = \sqrt{\frac{\hat{W}_x^2}{W_N^2} + \frac{\hat{W}_z^2}{W_N^2} \cdot \frac{I_z}{I_x}} \quad (3f)$$

In this case a more accurate relationship for the phase angle is:

$$\beta_N = \text{arctg} \frac{\sqrt{I_z/I_x} \cdot \hat{W}_z}{W_x} \quad (3e)$$

and means that in this definition the nutation phase goes through zero if the nutational motion about the second transverse axis goes through zero and at the same time the first transverse axis orthogonal thereto reaches its maximum ($\pm A_N$). According to the feature of claim 2, the signals ($\Delta t_{cx}$; $A_N$, $\beta_N$), formed step-by-step in the functional elements described above according to the rules given, are linked at the output of the modulator (406) or the amplitude-phase converter (409). The linking is accomplished such that the modulator makes a decision regarding necessity, algebraic sign and duration ($\Delta t_{cx}$) of a regulating intervention and the output signals of the amplitude-phase converter (409) make a decision regarding the time of the regulating intervention ($\Delta T_{cx}$) within a nutation period Pursuant to the invention, it is necessary to differentiate between two cases, depending on whether the pulse repetition frequency of the modulator prescribes one or two regulating interventions per nutation period In the first-mentioned case, a regulating intervention, the duration and algebraic sign of which are prescribed by the modulator, is carried out in the following region of the nutation angle ($\beta_N$, $0 \leq \beta_N \leq 360°$):

$$\gamma_o + \Delta\gamma - \Delta\gamma \leq \beta_N(t) \leq \gamma_o + \Delta\gamma + \Delta\beta \tag{3g}$$

if $$\frac{1}{2} \leq \frac{A_N}{\Delta P_x} \leq \frac{3}{2} \tag{3h}$$

i.e., if the instantaneous value (Equations 3d, 3f) of the continuously determined nutation amplitude ($A_N$) is more than one-half, but less than 1.5 times the nutation half-cone, which is generated by a minimum pulse ($\Delta P_x$) where $$\Delta P_x \stackrel{\Delta}{=} \frac{\Delta T_{cx}}{|H_y|} = \frac{T_{cx} \cdot \Delta t_{cx}}{|H_y|} \tag{3i}$$

$$\Delta\gamma(t) \stackrel{\Delta}{=} \arccos\left(\frac{1}{2} \cdot \frac{A_N}{\Delta P_x} + \frac{3}{8} \cdot \frac{\Delta P_x}{A_N}\right) \tag{3k}$$

or approximately:

$$\Delta\gamma(t) \stackrel{\Delta}{=} \sqrt{1 - \left(\frac{1}{2} \cdot \frac{A_N}{\Delta P_x} + \frac{3}{8} \cdot \frac{\Delta P_x}{A_N}\right)^2} \tag{3l}$$

and fixed values ($\gamma_o$, $\Delta\beta$) and preferably $$\Delta\beta \triangleq 0.1 \text{ rad} \tag{3m}$$

$\gamma_o = \pi_o - \alpha$ for positive regulating interventions
$\gamma_o = 2\pi - \alpha$ for negative regulating interventions
On the other hand, if the nutation amplitude ($A_N$, Equations 3d, 3f) is larger or smaller than the limits given, the control intervention is to take place in the following range of the nutation angle ($\beta_N(t)$; $0 \leq \beta_N \leq 2\pi$):

$$\gamma_o - \Delta\beta \leq \beta_N(t) \leq \gamma_o + \Delta\beta \tag{3n}$$

wherein
$\gamma = \gamma_o + \Delta\gamma$— is the optimum phase angle for the regulating intervention within a nutation oscillation $T_{cx}$— is the torque level of the regulating intervention
$\Delta t_{cx}$— is the duration of the regulating intervention commanded by the modulator
$\alpha$— the oblique installation angle of the final control element.

The other variables ($\Delta P_x$, $\gamma_o$, $\Delta\gamma$) are defined by the Equations (n 3i, 3m, 3l) describing them. In the case of two regulating interventions per nutation period, the first control intervention must be undertaken pursuant to the invention, if:

$$\gamma_o - \Delta\gamma_I - \Delta\beta \leq \beta_N(t) \leq \gamma_o - \Delta\gamma_I + \Delta\beta \tag{3o}$$

provided that $$A_N \leq 2\Delta P_x \tag{3p}$$

where:

$$\Delta\gamma_I = \arccos\left(\frac{A_N}{2\Delta P_x}\right) \tag{3q}$$

and the second regulating intervention if $$\gamma_o - \Delta\beta \leq \beta_{N2}(t) \leq \gamma_o + \Delta\beta \tag{3r}$$

In this connection, however, it is absolutely essential that the determination of the nutation amplitude ($A_N$) and phase ($\beta_N$) takes place in a time shorter than half the nutation period (Equation 1c). If, for instance, due to a high nutation frequency and/or slow data processing in the on-board electronics, this cannot be assured then, according to the precepts of the present invention, the condition for the second pulse according to Equation (3r) must be replaced by Equation (3s)

$$\beta_{N2}(t) = 2(\pi - \Delta\gamma_I) \tag{3s}$$

If on the other hand $$A_N > 2\Delta P_x \tag{3t}$$

then one must set
$$\Delta\gamma_I = 0 \tag{3u}$$

and the two conditions (3o) and (3r) merge into each other.

Figure 4C:
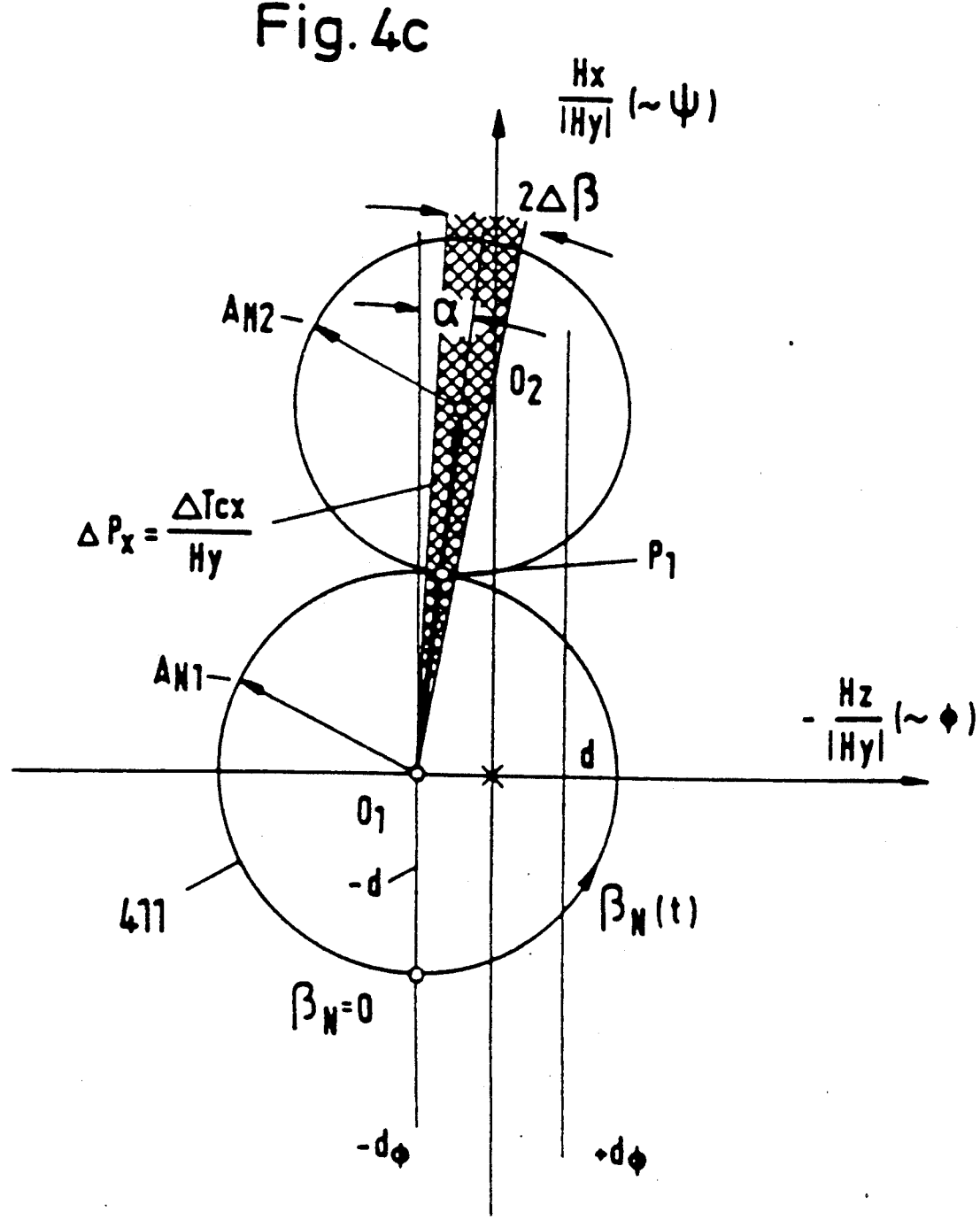
FIG. 4c shows a geometric illustration of the phase conditions for one optimum regulating intervention per nutation period.

The conditions for the generation of discrete regulating interventions in the inequalities (3g), (3o), (3r) for ensuring highly accurate command control and for energy-wise optimum nutation damping, formulated in the inequalities (3g), (3o) and 3(r), will be explained for a better understanding in somewhat greater detail by means of FIGS. (4c) and (4d):

FIG. 4c shows the intervention condition (3g) by means of a two-dimensionsal representation of the angular momentum vector in the orbit plane of a vehicle of the type under consideration. The normalized spin components in the direction of the mutually orthogonal transverse vehicle axes ($H_z/|H_y|$, $H_x/|H_y|$) are imagined to be plotted along the coordinate axes. The corresponding Euler angles ($\phi,\psi$), proportional to the angular momentum components, are given in parentheses. The circles drawn represent in schematized form nutation motions, which describe the tip of the vehicle angular momentum vector ($H_y$), which is essentially perpendicular to the plane of the drawing. The center of the respective circle (411, 412) marks the tip of the overall spin vector in the plane of presentation of the coordinate system of the orbit. The starting point $(\beta_N=0)$ of the nutation motion with an amplitude ($A_N$, Equations 3d, 3e, 3f), which corresponds to the radius of the circle (411), as well as the assumed orbiting direction are given. If now the z component of the overall angular momentum vector reaches the permissible limit of the dead zone ($-d_\phi$), which is used as intervention criterion, a regulating intervention ($\Delta T_{cx}$), which shifts the overall angular momentum vector by a distance ($\Delta P_x$, Equation 3i) into a new position ($O_2$), is induced. If, as is assumed in the present case, the torque level of the regulating intervention is high and the pulse duration very short in comparison to the nutation period, then the spin vector of the vehicle (H), after the regulating intervention executes a nutational motion, about the new position of the overall angular momentum vector as the center. The starting conditions of this nutational motion correspond to the position of the vehicle angular momentum vector prior to the regulating intervention. A torque increment ($\Delta t_{cx}$) about the x axis of the vehicle corresponds essentially to a angular momentum increment ($\Delta H_x$) along the same axis associated with a small component of opposite algebraic sign ($-\Delta H_z$) about the z axis of the vehicle because of the already described oblique installation of the reaction jets in the example considered. The minimum length of the angular momentum shifting vector is determined by the magnitude of the minimum realizable pulse increment.

From FIG. 4c it is seen graphically that the time for a control intervention is optimum when the phase angle of the nutation vibration just points in the direction of the spin increment, which is generated by the regulating intervention. This phase angle with a tolerance range ($2\Delta\beta$) is described mathematically by the condition of Equation (3g). The corresponding point is labeled $P_l$ in FIG. 4c. The time of the control intervention (3g) must be varied (3i, 3k) as a function of the magnitude of the minimum pulse ($\Delta T_{cx}$), the magnitude of the bias angular momentum ($H_y$) and the instantaneous nutation amplitude ($A_N$) in order to ensure that the remaining nutation amplitude also assumes its smallest possible value simultaneously after each regulating intervention undertaken to correct the angular momentum direction. If the starting conditions fall within the region in which the inequality (3h) is valid, this demand can always be met by a single regulating pulse. Outside of this region, the instruction (Equation 3n), which is then to be employed, ensures the best possible, energy-optimum nutation decay; however, the least possible residual nutation is not achievable with a single regulating intervention.

Figure 4D:
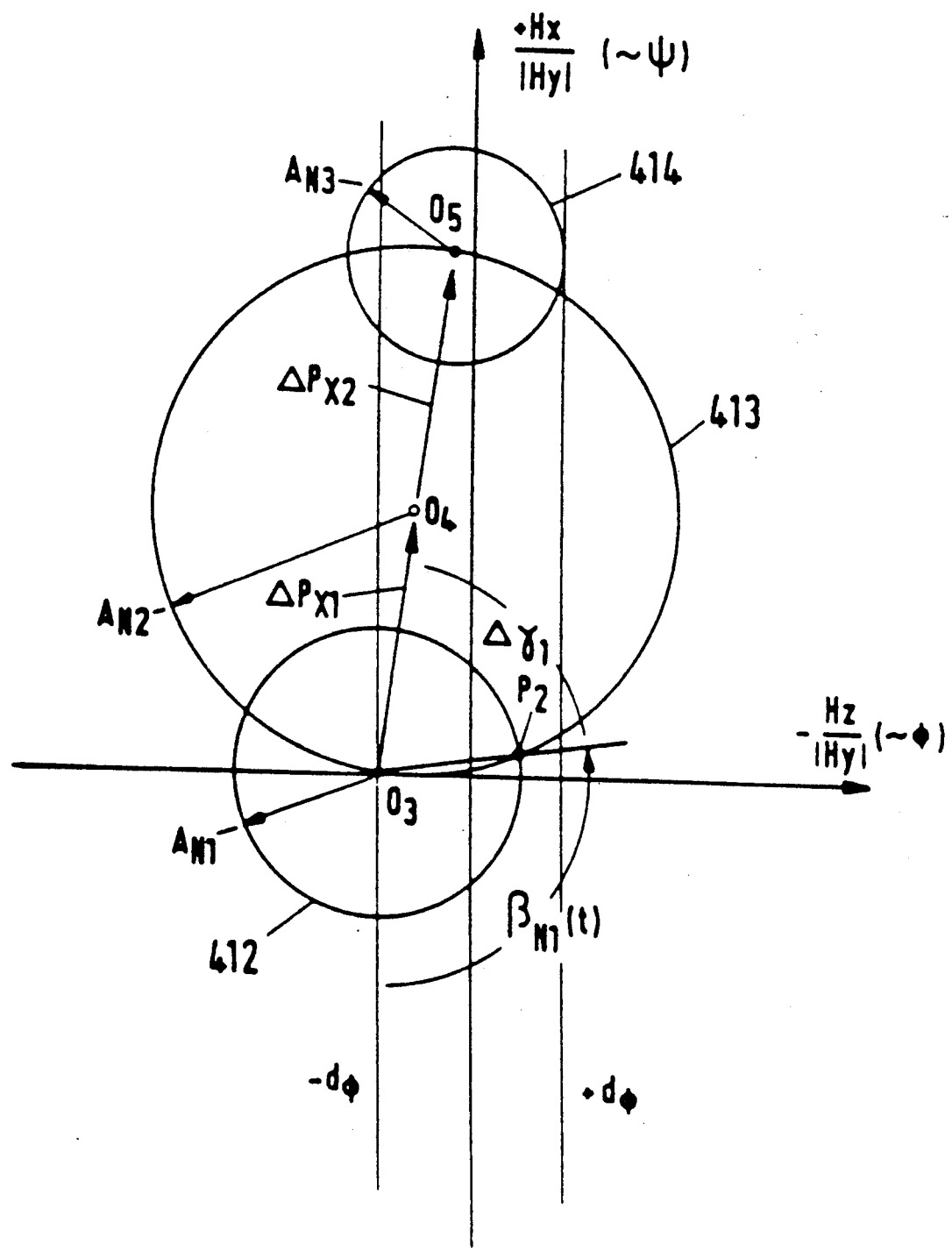
FIG. 4d shows a geometric illustration of the phase conditions for two optimum regulating interventions per nutation period.

If the disturbance torques acting on a vehicle of the type under consideration or the deviations of the vehicle axes from their set position are so large, that two regulating interventions per nutation period are required by the modulator output signal, then the actuating instructions of Equations (3o) to (3u) must be employed pursuant to the invention. The corresponding relationship are shown in FIG. 4d. An energywise optimum shift of the angular momentum vector, that is, the center ($O_3$) of a nutation circle (412) in FIG. 4d, is reached according to the already mentioned Posicast principle when two control interventions of the same magnitude are made in time of half a nutation period, however, without a decay of an incipient mutation being achieved at the same time. If the starting amplitude of the nutation is smaller than the shift of the angular momentum vector (Equation 3p) brought about by two regulating pulses, optimum nutation damping is reached pursuant to the invention (3o) without an increase in the required expenditure of energy, if the first regulating intervention takes place at a phase angle, which follows the intersection ($P_2$) of the starting nutation circle (412) ($A_{Nl}$) with a second imaginary nutation circle (413) ($A_{N2}$), the center ($O_4$) of which is shifted by angular momentum increment corresponding in magnitude and direction to the regulating intervention, as indicated in FIG. (4d). The second regulating intervention (Equation 3r) then shifts the orbital angular momentum vector at the correct time to the place, where the direction of action of the regulating intervention crosses the nutational motion, so that the nutational motion ($A_{N2}$) initiated to shift the spin is eliminated, and the residual nutation ($A_{N3}$) becomes a minimum.

From the description of the functional elements (401 to 410) of the invention shown in FIGS. (4a) and (4b), especially the Equations (3a to 3u) representing the operating features, it can be seen that for realization of the invention, it is necessary to know several system-related parameters. The numerical value of some of these system parameters, however, are subject either intentionally or because of changing operational conditions of use, such as temperature variations, aging, service life and the like to fluctuations with time, which have an adverse effect on the quality of the inventive control devices, which are aimed at optimum behavior. According to a further embodiment of the invention, it is therefore proposed to determine the instantaneous values of the system parameters which are subject to substantial changes, and to take these values into consideration for implementation of the invention.

In FIG. 5a, the functional schematic diagram of a control device expanded accordingly is shown. It has already been mentioned that the angular momentum storage devices are used to stabilize such vehicles about their pitch (y) axis (FIG. 1) which is orthogonal to the orbital plane. Within the scope of the nominal operating range, a change in the amount of angular momentum of, for instance, ±10% is connected therewith. Since the mass properties of such angular momentum storage components are known very accurately, the magnitude of the angular momentum can easily be determined with the help of a measurement of the rotational speed of the spin wheel or also of only the back-EMF of its drive motor on board the vehicle and its exact value can be taken into consideration without difficulty in carrying out the inventive instructions. As is seen readily, the magnitude of the angular momentum ($H_y$) enters into the conditional equation for the nutation frequency ($W_N$, Equation 1c), the nutation amplitude ($A_N$, Equation 3f), the nutation observer (Equation 3c), the phase angles of the regulatory interventions ($\Delta\gamma$, Equations 3k, 3l, 3q), the normalized spin increment (3i) and the control laws (Equations 3g, 3n, 3o, 3r, 3s) and into their application criteria (3h, 3p).

In a similar manner, taking into account the best possible knowledge of the actually generated regulatory intervention, such as jet pulses delivered ($\Delta T_{cx}, \Delta T_{cz}$), leads to the maintenance of the optimality conditions and to rapid transition of the inventive functional elements (408, 409, 410) or of the algorithms and/or networks representing them to a steady state. The efficiency of the reaction jets, i.e., their effectively delivered pulse increments depend to a considerable degree on the pulse duration ($\Delta t_{cx}$), their triggering signals and drop to below 50%, especially for small triggering times (for instance, $\leq 10$ msec). This operating range, however, is of special interest in practice for accuracy reasons, since the residual nutation, among other things, is determined by this variable. The functional dependence of the effective pulse increment on the thruster on-time can be determined, for instance, prior to the use of such components, by test stand measurements, stored on board and called up for the duration of the respective regulating interventions required by the modulator (406) and taken into consideration accordingly in the algorithms (Equations 3c and following). This procedure is called "controlled adaptation" and is indicated schematically by the additional introduction or feedback of the variables angular momentum ($H_y$) and pulse increment ($\Delta T_{cx}, \Delta T_{cz}$). Of course, the parameter mentioned can instead also be determined completely or partially by additional observers and estimation algorithms provided on board or on the ground. In accordance with the rule valid in practical applications that anything, which can be measured by simple means, should not be estimated, it is however advisable, for the further improvement, to determine only those variables by estimating procedures, which are not accessible at all to direct measurement or only with a considerable additional expenditure of measuring means. This may apply, for instance, to unforeseen changes or changes occurring over the life span of the functional relationship between efficiency and the pulse duration of reaction propulsion mechanisms resulting from changes in the supply pressure, mixing ratio of the fuel components and aging processes. In this case, the effective pulse increment can also be identified, for instance, from the difference between the theoretical and the estimated nutation amplitude in an expanded nutation observer and be taken into consideration in the data processing algorithm and/or control algorithm. The repeatedly mentioned torque components about the second transverse axis, which are generated simultaneously with regulating interventions about a first vehicle axis, can also be realized, instead of by the oblique installation of the final control elements about the first axis, by the simultaneous triggering of final control elements acting on the second axis with the same signal ($\Delta t_{cx}$) but reverse algebraic sign. The possible effects of such a procedure will be discussed later on.

Another expansion of the present invention, which is particularly important for the improvement of the orientation accuracy and is based on observer and estimation methods, is shown in FIGS. (5b), (5c). It consists of the determination of the disturbance torques acting on the vehicle and their compensation.

As indicated schematically in FIG. (5b), it is proposed for this purpose to expand the already described angular momentum controller (404) by an disturbance torque observer and to superimpose on the subsequent dead zone modulator combination the estimated values obtained. The disturbances occurring during the normal operating phase of such space vehicles should be thought of as being split by means of a Fourier analysis into constant components and integral multiples of the orbiting frequency ($W_o$), the amplitudes of the higher harmonics ($2W_o$, etc.) being more or less strongly pronounced, depending on the geometric shape of the vehicle. For expanding the angular momentum controller (404) into an angular momentum controller and a disturbance torque controller (504, 505), recourse is had to the observer form of the angular momentum controller (Equation 3a), the complete model equations of which contain disturbance torque terms ($T_{Dx}, T_{Dz}$) about the transverse vehicle axes. If one substitutes in this presentation, for instance, the disturbance torque about the first transverse axis ($T_{Dx}$) by its optimum estimated value ($T_{Dx}$), which can be obtained within the scope of an expanded angular momentum and disturbance observer algorithm (Equation 4a) and if the quantities determined in this manner are connected via suitable gain factors ($K_{Hz}, K_{D\times 0}, K_{D\times 1}, K_{D\times 2}$) in the manner of a state controller (505, Equation 4b) to the input of the subsequent functional element (506) of the inventive control device, the functional element (506) acting on the first transverse axis (x axis), the desired angular momentum control and disturbance torque compensation is achieved. Assuming that the disturbance torque profile about the first transverse axis (x axis) is described sufficiently accurately by its constant component and a first harmonic, the observer and controller equations are as follows:

$$\begin{bmatrix} \dot{H}_x \\ \dot{H}_z \\ \dot{T}_{Dx0} \\ \dot{T}_{Dx1} \\ \dot{T}_{Dx2} \end{bmatrix} = \begin{bmatrix} 0 & -W_o & 1 & 1 & 1 \\ W_o & 0 & 0 & 0 & 0 \\ 0 & 0 & 0 & 0 & 0 \\ 0 & 0 & 0 & 0 & -W_o \\ 0 & 0 & 0 & W_o & 0 \end{bmatrix} \begin{bmatrix} H_x \\ H_z \\ T_{Dx0} \\ T_{Dx1} \\ T_{Dx2} \end{bmatrix} - \quad (4a)$$

$$\begin{bmatrix} k_{11} \\ k_{21} \\ k_{31} \\ k_{41} \\ k_{51} \end{bmatrix} (H_y \dot{\phi}_o - H_z) \begin{bmatrix} 1 & 0 & 0 & 0 & 0 \\ 0 & 1 & 0 & 0 & 0 \end{bmatrix}^t \cdot \begin{bmatrix} T_{Dx} \\ T_{Dz} \end{bmatrix}$$

$$\eta_x = [K_{Hz} \; K_{Dx0} \; K_{Dx1} \; K_{Dx2}] \cdot [H_z \; T_{Dx0} \; T_{Dx1} \; T_{Dx2}]^T \quad (4b)$$

wherein the designations of Equation (3a) apply and additionally $T_{D\times 0}$ — is the estimated value of the constant disturbance torque component ($T_{D\cdot 0}$) about the x-axis $T_{D\times 1}, T_{D\times 2}$ — are the sine and cosine components of a periodic disturbance torque component acting on the first transverse axis (x-axis) with a rotational frequency ($W_o$)

$K_{31}, K_{41}, K_{51}$ — are gain factors $K_{Hz}, K_{D\times 0}, K_{D\times 1}, K_{D\times 2}$ — are the gain values of the state controller $\eta x$ — is the output signal of the state controller (input signal of the dead zone/modulator member 506) and $[\ldots]^T$ — are transposed vectors—matrices In the present case, the superimposition of only one component (for instance, $T_{D\cdot 1}$) on the harmonic disturbance torque portion in the compensation part of the state controller (505) is sufficient, since the phase relationship automatically adjusts itself via the disturbance torque observer. For the case that the second or higher harmonic of the disturbance torques has an appreciable amplitude, the disturbance observer and the controller can, of course, be expanded accordingly in a manner known per se and specifically by two orders each per additional periodic component.

The principle of a particularly advantageous embodiment of an disturbance torque compensation is shown in FIG. (5c). According to this, instead of the estimated values of the disturbance torques ($T_{D\cdot 0}(t), T_{D\cdot 1}(t)$) of the disturbance torque observer (504) determined at the time (t), predicted values of these variables ($T_{Dx0}(t-1/W_o)$, $T_{Dx1}(t-1/W_o)$), which are taken from an disturbance torque memory (511), and the values of which were determined and recorded at an appropriate time of the previous orbiting period ($1/W_o$), are superimposed in the state controller (505). The estimated values, determined in this case by the disturbance torque observer (504), then do not represent the absolute values, but rather the deviation from the superimposed predicted values and are added to these to form a new predicted value for the same point in time of the subsequent orbital period. In this manner, only the daily change in the interference torque profile occurs as an disturbance torque that has to be controlled, for instance, in geosynchronous satellites, in a steady state of the control loop. The orbit angular momentum component ($H_z(t)$), on the other hand, is used directly and without intermediate storage for angular momentum control, as shown in FIG. (5b). In this basic block diagram, use is also made of the mentioned fact that, in the normal case, the value of the command given ($T_{Dz1}$) by itself, is sufficient for one harmonic disturbance torque component.

The accuracy improvement of the command control of a vehicle of the mentioned kind according to FIGS. (5b, 5c) brings with it yet another advantage. It has namely been ascertained that the estimated value for the total angular momentum component ($H_x$) in the direction of the first transverse vehicle axis, obtained in an observer according to Equation (4a) or a reduced form thereof likewise shows a considerable improvement in accuracy. As explained in the discussion of the dynamic processes in connection with FIGS. 4c and 4d, this angular momentum component is proportional to the orientation error about the second transverse vehicle axis and can therefore be used advantageously for control about this axis provided that the nutation controller (510) is linked advantageously. For this purpose, there is in FIG. (5c) a state controller (512), which corresponds to the functional unit (505) and can also contain the superimposition of the second Fourier component of the harmonic disturbance from the disturbance torque observer (504) via a corresponding gain factor ($K_{Dx2}$) and acts on the nutation controller (510) via a second dead zone/modulator combination (513). For the linkage of the additional output signals of the second (z) modulator (513) in the nutation controller (510) for generating optimum regulating interventions about the transverse vehicle axes, the already described intervention conditions apply (Equation 3g and following), provided only that the appropriate numerical values are inserted for the angular momentum shift directions ($\gamma_o$) associated with the respective regulating interventions. These values ($\gamma_o$) are listed in Table 1 for all possible initial deviations and regulating interventions. In conclusion, it should be mentioned that the design of the angular momentum observer and disturbance torque observer according to Equation (4a) can be realized in complete or in simplified form, as described, for instance, in conjunction with Equation (3a). A possibly advantageous conversion into corresponding transfer functions and their realization through equivalent algorithms or networks presents no difficulties to one of skill in the art.

In the following FIGS. (6a) to (6d), further embodiments of the invention are shown. Their purpose is to increase further, if possible without additional expense for equipment, that is, by using measuring and regulating components available anyhow, the orientation accuracy about the second transverse axes, the z or yaw axis of vehicles of the kind under consideration. In connection with the typical arrangement of components shown in FIGS. (1b) and (1c), it has already been explained that, through use of sun sensors, which are also required for acquisition maneuvers and orbit correction maneuvers, position reference signals for the second transverse axis are available over wide angular ranges, in the case of geosynchronous satellites, for instance, over twice 8 to 10 hours per day.

In FIG. (6a), use is made of this (yaw) information (deviation $\epsilon\psi$) in an additional controller branch, which consists of a third controller network (601), a second angular momentum controller (602) and a modulator (604) with a dead zone (603) and furnishes to a nutation controller (610) additionally information regarding necessity, algebraic sign and duration of regulating interventions about a second transverse vehicle axis. The starting point for controlling a first transverse axes in this basic block diagram once again is a simpler configuration of the inventive apparatus as shown, for example, in FIG. (5a). For the design of the additional functional elements of the controller branch for a second transverse axis, particularly the controller network (601), angular momentum controller (602), dead zone and modulator (603), the considerations, which apply, are the same as those used for the description of the angular momentum control loop for the first transverse axis. However, the orbital motion component ($\psi_o$), which can be obtained from the signal of the deviation of the second transverse axis from its set direction via the third controller network (601), which preferably exhibits lowpass behavior, is then, however, proportional to the component of the vehicle angular momentum ($H_x$) in the direction of the first (x−) vehicle axis. The second angular momentum controller (602) has proportional, PD or PID behavior and is optionally constructed, together with the third controller network (602) according to the features of claim 1. If the x component of the vehicle angular momentum ($H_x$) exceeds the response thresholds of a dead zone section (603), which can be realized separately or together with the modulator, then a modulator of the possible types already described decides the necessity, algebraic sign and duration of regulating interventions about a second transverse vehicle axis.

At this point, the present invention has a very important characteristic feature. Until now, it was always assumed that a signal, which can be obtained from the deviation of a first transverse vehicle axis (x axis) from its set direction, can also be used to make regulating interventions about said first transverse axis according to the already detailed intervention criteria. It would be obvious to proceed in the same manner also for the regulating interventions relating to the second transverse vehicle axis (z axis) and to trigger therefrom also the necessary regulating interventions ($\Delta T_{cz}$) about just this axis via controller networks (601, 602), dead zone sections (603) and a related modulator (604). It is found, however, that such a procedure does not lead to energywise optimum motion processes. With reference to FIG. (4c) and the associated description, it is evident that a regulating pulse, derived from the deviation of a first transverse axis (x axis) and generating control torques about this first transverse axis, predominantly generates a shift of the spin vector in space. This shift corresponds to a deviation of the second transverse axis from its set direction. Pursuant to the invention, it is more advantageous to interchange the assignment of the regulating interventions about the respective axes or the information obtained from the measurement signals. However, the regulating interventions about the two transverse axes shall continue to be made, in accordance with the teachings of the invention, in correlation with the instantaneous state of the nutational motions.

According to this further embodiment of the invention, the signal portion ($\phi_o$), obtainable from the measurement signal for the deviation ($\epsilon_\phi$) of a first transverse axis (x axis) via a first controller network (401) for a first component of the orbital motion, and the signal portion ($\psi_o$), obtainable additionally from the measurement signal for the deviation ($\epsilon\psi$) of a second transverse axis (z) via a third controller network (601) for a second component of the orbital motion are linked in a nutation controller with the signal component ($\phi_N$), which is representative of the nutational motion and obtainable over a second controller network (402, FIG. 4a) or an equivalent subtraction (403) from the measurement signal ($\epsilon_\phi$) and the output signal ($\phi_o$) of a first controller network (401), in such a way that, by means of the first signal portion ($\phi_o$), representing a first component of the orbital motion, after passing through a first angular momentum controller (404), a dead zone section (405) and a second modulator network (604), the decision regarding the necessity, algebraic sign and duration of a regulating intervention about a second transverse vehicle axis (z axis) can be made by means of a third signal portion ($\psi_o$) representing a second component of the orbital motion, that, after passing through a second angular momentum controller (603), a second dead zone sections (603) and a first modulator network (605), the decision regarding the necessity, algebraic sign and duration of a regulatory intervention about a first transverse vehicle axis (x axis) can be made and that, with the help of a second signal portion ($\phi_N$) representing the nutational motion, after signal processing in a differentiation section (407) a nutation observer (408) and an amplitude-phase converter (409), the time for the respective regulating interventions within a nutation period can be fixed. The conditions generally formulated mathematically in the inequalities (3g) to (3u) for the time or phase angle ($\beta_N$) of the regulating interventions within a nutation period and the employment regions related to the respective nutation amplitude ($A_N$), for instance, Equation (3h, 3p) retain their validity if the variable ($\Delta P_x$) used there is replaced throughout by a new variable ($\Delta P$), which is defined as follows:

$$\Delta P = \sqrt{\Delta P_x^2 + \Delta P_z^2} \tag{5a}$$

$$\Delta P_x = \frac{\Delta T_{cx}}{|H_y|} = \frac{T_{cx} \cdot \Delta t_{cx}}{|H_y|} \tag{3i}$$

$$\Delta P_z = \frac{\Delta T_{cx}}{|H_y|} = \frac{T_{cx} \cdot \Delta t_{cx}}{|H_y|} \tag{5b}$$

where $\Delta P_x$, $\Delta P_z$— are the normalized angular momentum increments $T_{cx}$, $T_{cz}$— are the control torque levels about the transverse vehicle axes ( x, z)

$\Delta t_{cx}$, $\Delta t_{cz}$— are the duration of the regulating intervention prescribed by the respective (x—, z—) modulator for the corresponding transverse axis.

Furthermore, for optimum angular momentum control and simultaneous nutation damping for regulating interventions about the first (x—) and/or second (z—) transverse axis, the corresponding correct angle of action ($\gamma_o$) of the spin increment ($\Delta P$) generated must be inserted in the intervention conditions. For the definition of this angle, it is necessary to differentiate between three cases, depending on whether, according to the instruction of the modulator output signals, a regulating intervention should take place only about the first transverse vehicle axis (x axis)

only about the second transverse vehicle axis (z axis) or about both vehicle axes (x=roll axis, z=yaw axis) within a nutation period. The numerical values for the reference angle ($\gamma_o$) are listed for all three cases that can occur in Table 2 as a function of the permitted deviations, i.e., the threshold values of the dead zone sections (405, 603) downstream from the first (404) or second angular momentum controller (602).

The diagram of FIG. (6e) serves to illustrate the numerical values given in Table 2 for the conditions that trigger the regulating interventions (Equation 3g and following). Pursuant to the invention, the condition is first assumed that the remaining nutation cone should be as small as possible after regulating interventions have been executed With reference to the explanations of FIGS. (4c, 4d), the steady-state value of the residual nutation is determined by the magnitude of the physically realizable, minimum regulating increment or the corresponding increment of the angular momentum shift ($\Delta P_{H1n}$), the value of which, upon the generation of a minimum pulse ($\Delta P_{xMin}$, $\Delta P_{zMin}$) about each transverse axis, is fixed within a nutation period by Equation (4a). If the control law prescribes a control action about each of the transverse axes, these regulating interventions are advantageously triggered simultaneously. For increments of equal magnitude for the two axes, this corresponds to a angular momentum shift direction of less than 45° in the diagram of FIG. (6c). On the other hand, if only one regulating intervention about a transverse axis of the vehicle is required, its value can be chosen larger than the specified minimum value by a factor $\sqrt{2}$ for quantitatively the same shift of the angular momentum vector. This results in a desired improvement in propellant efficiency if, for example, reaction jets are used. With reference to FIG. (6e), upon interventions about only one transverse axis, the spin is shifted parallel to the coordinate axes ($\Delta H_x/|H_y|$, $\Delta H_z/H_y$). Accordingly, this requires threshold values of at least $|d_\phi| = |d\psi| = P_{Min}/2$ and determines the average orientation accuracy of the transverse vehicle axes. Average orientation errors of the vehicle angular momentum vector ($-\Delta H_z$, $\Delta H_x$), corresponding to the deviations of the vehicle axes ($\epsilon_\phi$, $\epsilon_\psi$) from their set orientation, are represented in FIG. (6c) by deviations from the coordinate origin (O) and should theoretically be reversed by angular momentum increments or regulating interventions, which return the angular momentum vector to the origin (O). For a given magnitude of the minimum pulses, this is not possible is one step from every starting position corresponding to arbitrary deviations about the two transverse vehicle axes. Pursuant to the invention, the deviation field (6e) is therefore divided into eight sectors from which the return to the best possible vicinity of the origin ($\pm d\phi, \pm d\psi$) takes place through regulating interventions

| $\pm \Delta T_{cz}$ | from the sectors I, II |
|---|---|
| $\pm \Delta T_{cx}$ | from the sectors III, IV |
| $\pm \Delta T_{cx}$ and $\Delta\Delta T_{cz}$ | from the sectors V, VI, VII, VIII | corresponding to the action directions ($\gamma_o$) of the angular momentum changes ($\Delta P_x$, $\Delta P_z$) brought about by the regulating interventions. For example, a positive deviation of the first transverse axis or x axis ($\epsilon_\phi \sim \phi_o \sim -\Delta H_z > +d\phi$) in sector I (point $P_1$) triggers a regulating pulse ($+T_{cz} \sim +\Delta H_z$), which shifts the angular momentum vector parallel to the abscissa axis (FIG. 6e, $P_I \rightarrow P_I^*$) but can reach the null point accurately only if, at the same time, the deviation about the second transverse axis (z axis) just happens to be zero; i.e., the deviation of the second transverse axes remains unchanged, if the change in the nutation oscillation, which is simultaneously associated with the shift, is not taken into account. By maintaining the phase conditions in the nutational motion process at the time of the regulating intervention (Equation 3g and following) and the duration that is determined by the modulator, optimum nutation damping and minimum residual nutation is ensured simultaneously with the angular momentum vector shift.

In a second case under consideration, if the deviation of both transverse axes from their set direction, exceeds the permissible limits ($\epsilon_\phi \sim \phi_o \sim -\Delta H_z > +d\phi$), ($\epsilon_\psi \sim \psi_o \sim +\Delta H_x > d_\psi$), which corresponds to a point (Pv) in the intervention sector V (FIG. 6e), then a positive regulating intervention about the second transverse axis ($\Delta T_{cz} \sim +\Delta H_z$) and a negative intervention about the first (x−) axis ($\Delta T_{cx} \sim -\Delta H_x$) are triggered simultaneously. If the interventions are of equal magnitude, they bring about a shift in the angular momentum vector of less than 45° in the direction of the null point. A simultaneous decay of the nutation is assured, in turn, by adhering to the phase condition for the nutational motion at the time of intervention ($\beta_N(t)$). For the complete allocation of the regulating interventions according to algebraic sign ($\pm \Delta T_{cz}$, $\pm \Delta T_{cx}$) and for the associated spin shift directions ($\gamma_o$) which are to be inserted in the intervention conditions (Equations 3g and 3f) as a function of the deviations of the transverse vehicle axes (sectors I to VIII), reference is made to Table 2.

Figure 6A:
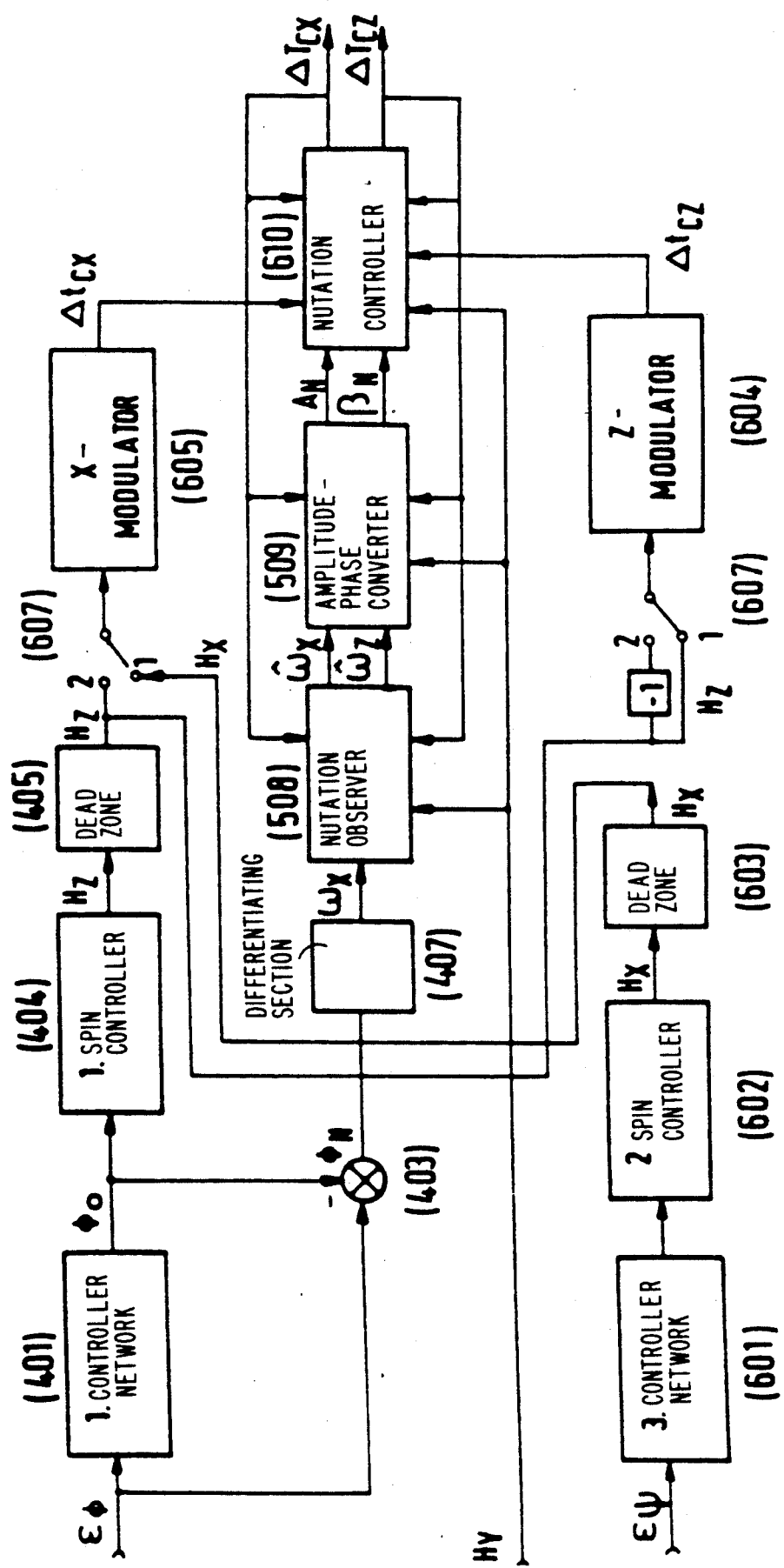
FIG. 6a shows a device for substantially improving the orientation accuracy of a second transverse vehicle axis with at least intermittently available measurement values relating to the second transverse axis.
Figure 6B:
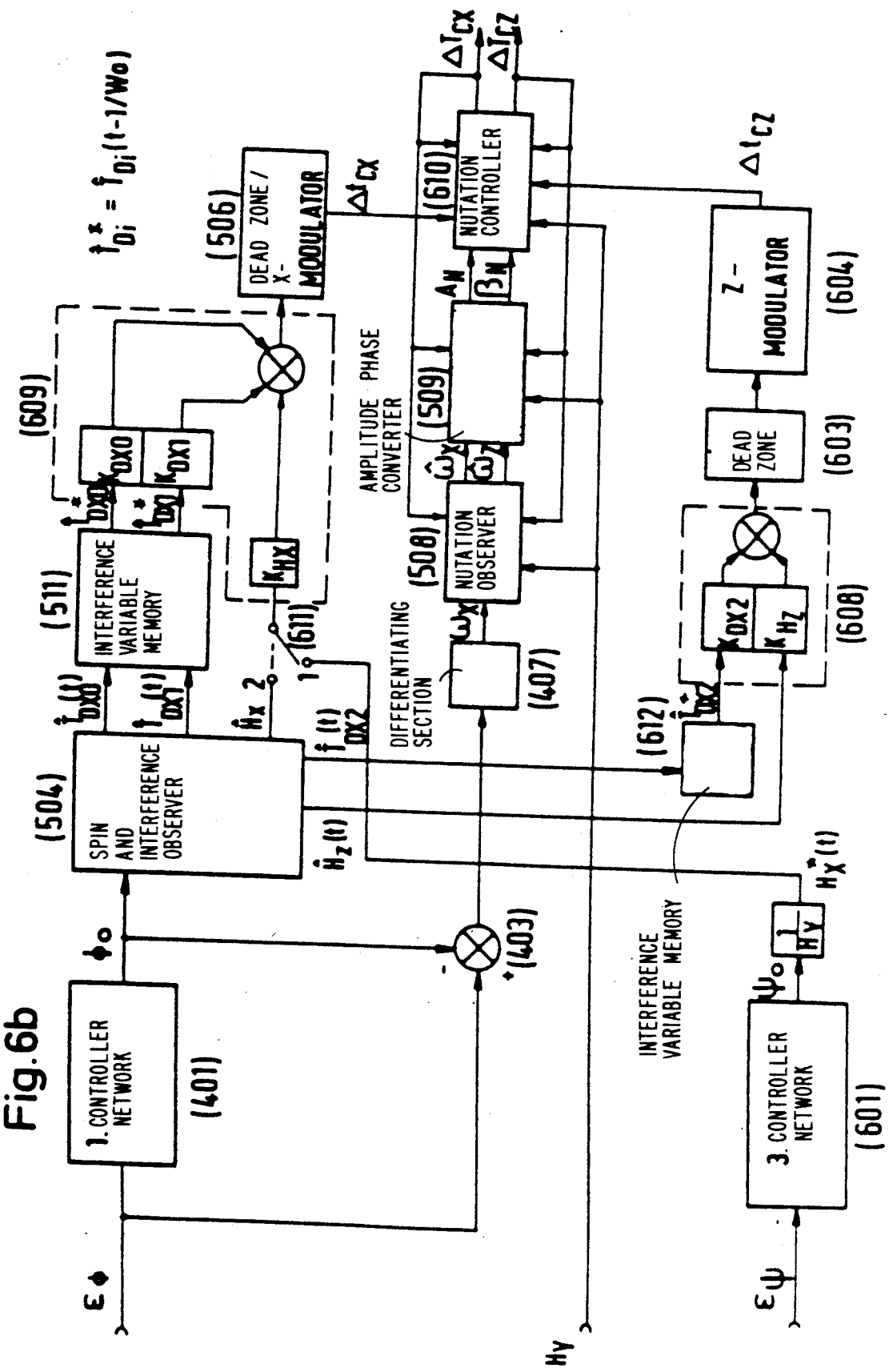
FIG. 6b shows a further improved embodiment of the invention of FIG. 6a with estimation of and compensation for the disturbance variable.
Figure 6D:
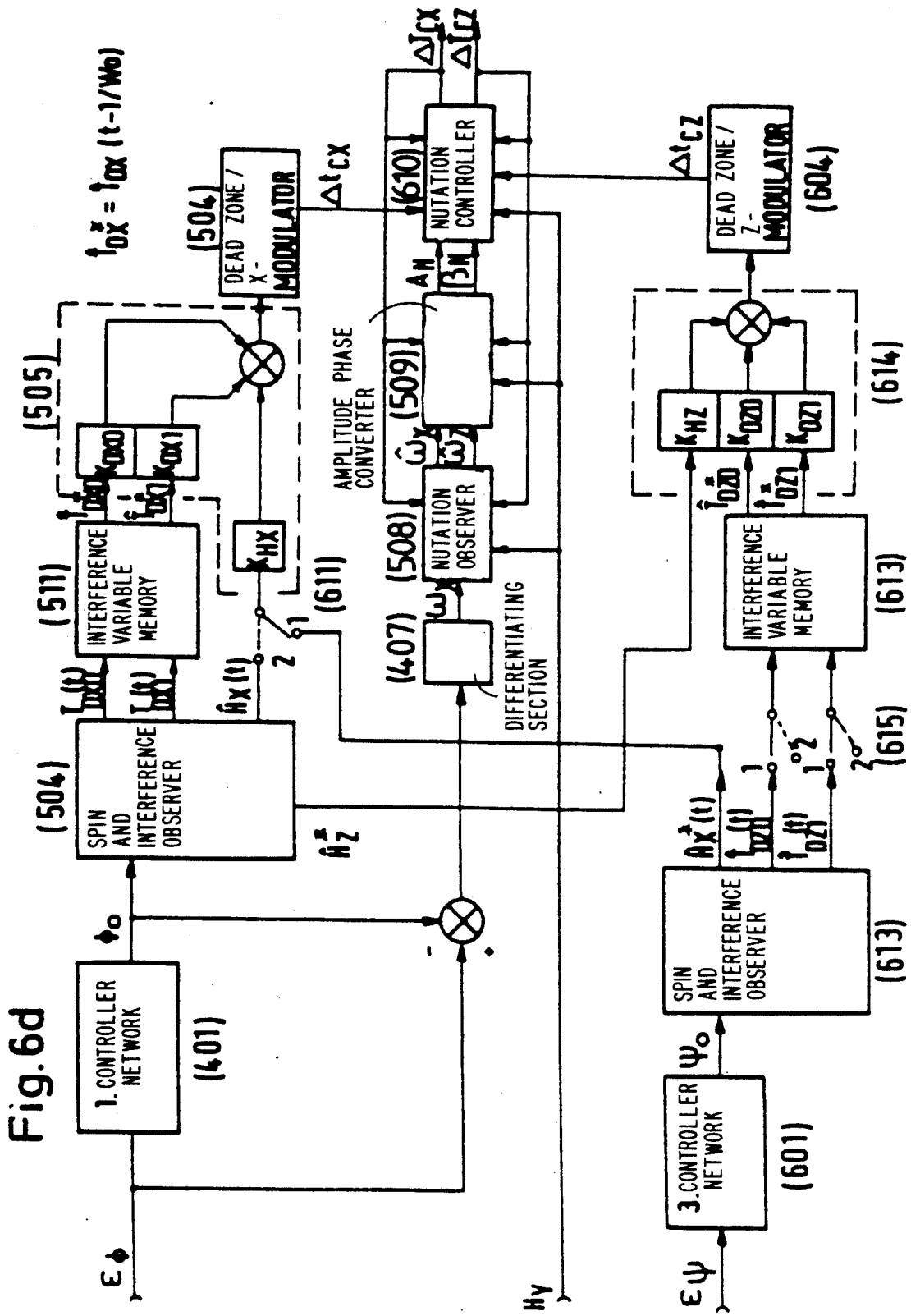
Figure 6E:
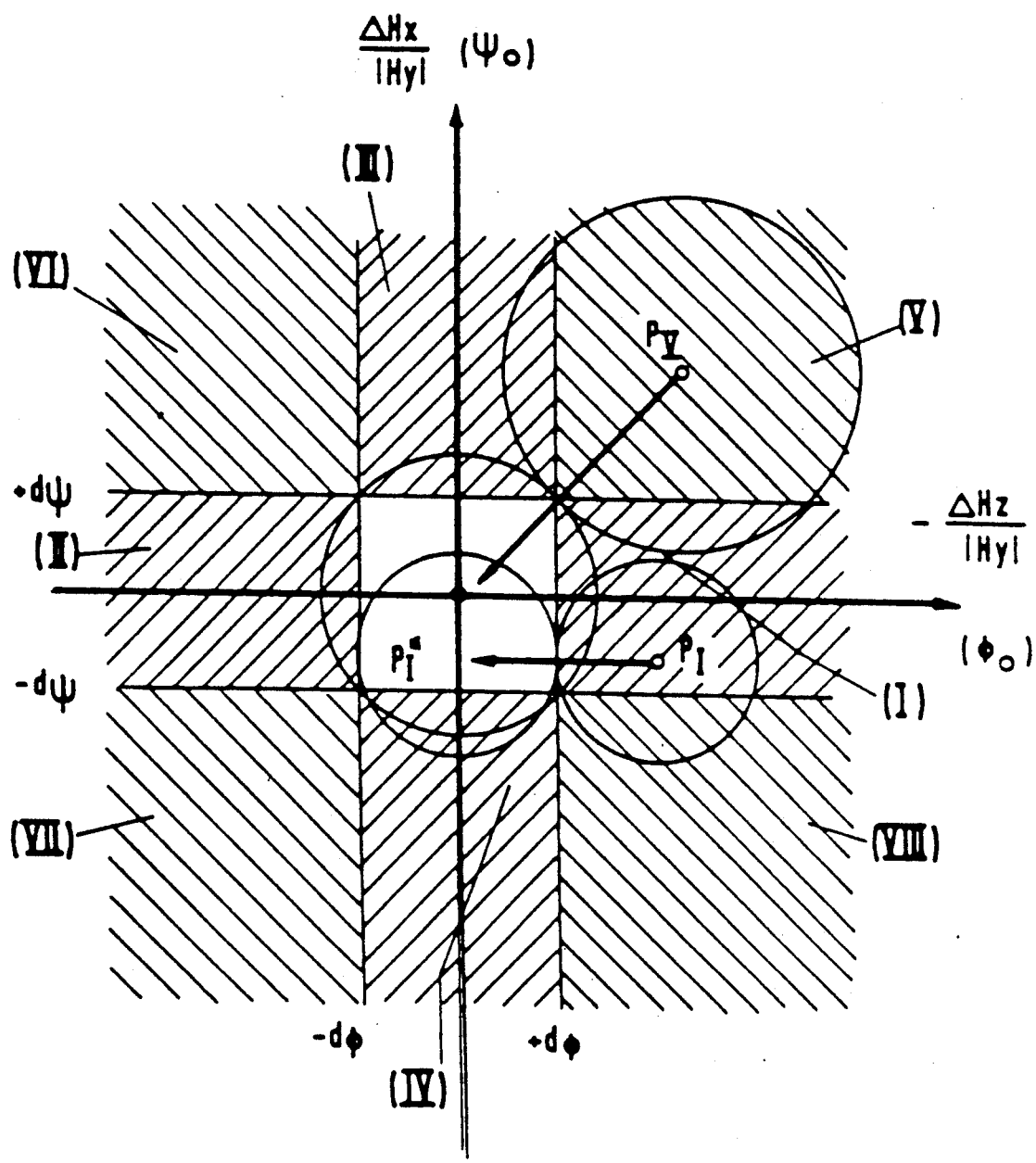
FIG. 6e shows a geometric illustration of the inventive specifications for linking the modulator output signals and the effects of the regulating intervention.
Figure 7C:
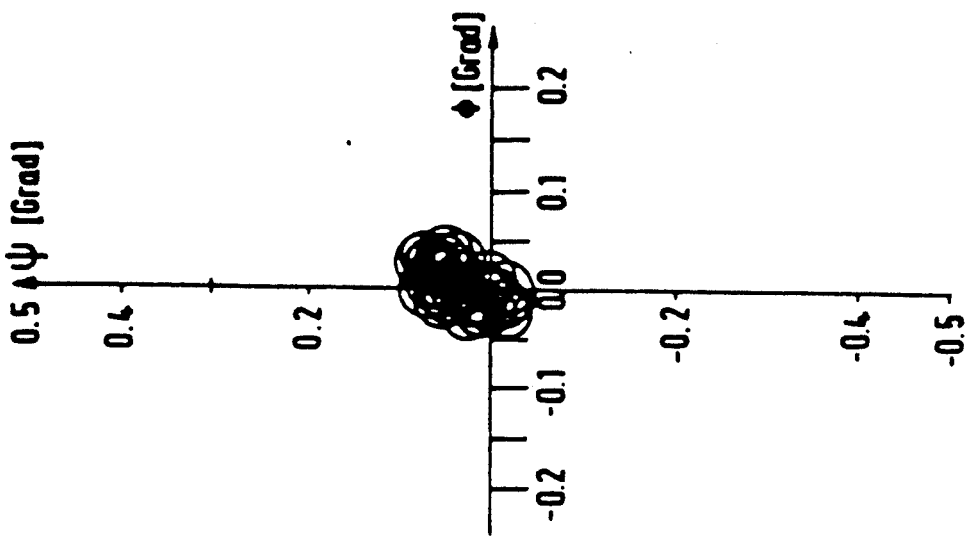
FIGS. 7a to 7c show simulation results of a representation of the axis movements of vehicles of the considered type, which are equipped with inventive control devices.
Figure 7B:
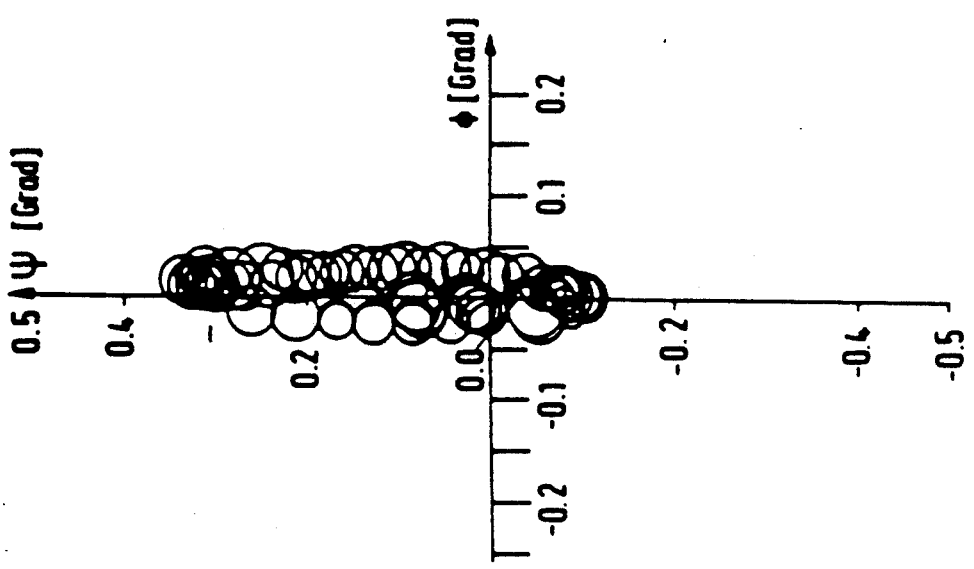
Figure 7A:
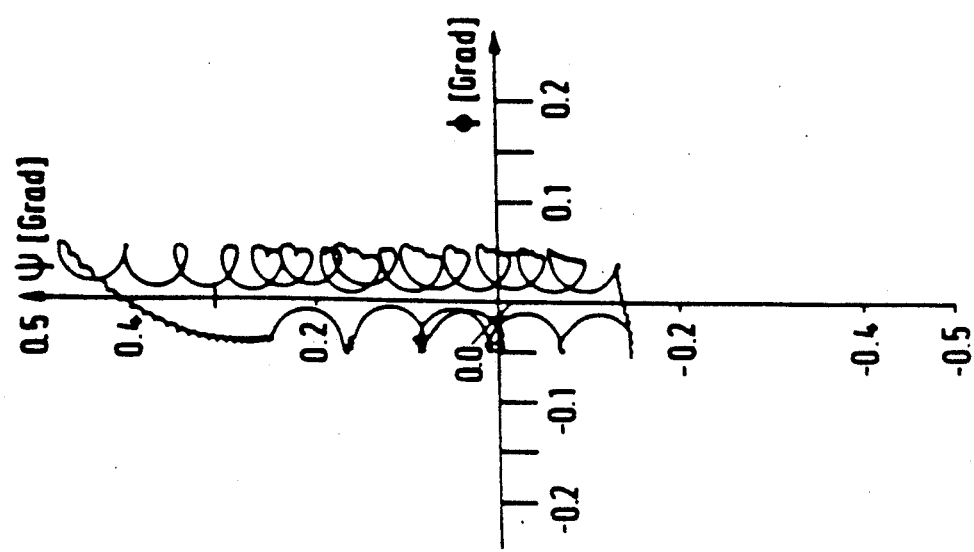

In FIG. 6a, a double throw switch (607) is indicated, which has changeover contacts in both channels and with the aid of which the control loops must be switched when the attitude reference about the second transverse vehicle axis is lost. If the final control elements about the first transverse axis, as was assumed in the previous embodiments (for instance, through an oblique installation about the angle α), are arranged so that they generate simultaneously a torque component of opposite sign about the second transverse axis, a changeover of the axes allocation for instance, of their modulators, into a configuration corresponding to the previous embodiments (for instance, FIGS. 4a, 5a or 5b) and a simultaneous switching-off of the additional spin control channel (H$_x$) of FIG. (6a) is sufficient in the simplest case. The position of the second transverse axis will, admittedly, then drift away under the influence of external disturbances and as a function of the magnitude and algebraic sign of these perturbations. In general however, as a result of the relatively accurate orientation of the axis at the changeover time, smaller orientation errors will be built up at the in the limited periods of unavailable attitude reference than in the previously considered comparison examples. If the final control elements for the first transverse vehicle axis are not arranged so that, for each intervention, they simultaneously also generate torque components of opposite algebraic sign about the second transverse axis, stability and orientation about the two transverse axes can be assured in the same manner in this case, according to a further embodiment of the invention, by the provision that, with every regulating intervention about the first transverse axis a torque increment of the opposite algebraic sign is simultaneously also generated about this vehicle axis by appropriately triggering the final control elements for the second transverse axis. This case is schematically shown in FIG. (6a) and corresponds to position 2 of the double double-throw switch (607). As seen physically, this corresponds, for the same torque increments, to an effective inclination angle of the final control elements about the first axis of 45°, and all considerations, made in connection with corresponding previous embodiments retain their validity. In FIG. (6b), the functional schematic diagram of a different embodiment of the present invention is shown. It combines the essential features of the control devices of FIGS. (5c) and (6a) and, therefore, their advantages. In an already described angular momentum and disturbance torque observer (504), estimated values of the components of the vehicle angular momentum (H$_z$, H$_x$) and the constant component (T$_{D.0}$) as well as periodic disturbance torque components are formed according to the algorithm of Equation (4a). Of these, for the sake simplicity, only the components of the first harmonic (T$_{D\times 1}$, T$_{D\times 2}$) are shown. With reference to the comments made in connection with FIG. (6a), the angular momentum component in the direction of the second transverse vehicle axis (H$_z$) is used in the sense of a state control with a suitable gain factor (K$_{Hz}$) and a dead zone (603) for generating control interventions about a second transverse axis (z axis) by means of a modulator (604). Instead of an estimated value for this angular momentum component (H$_z$) formed in the angular momentum and disturbance torque observer (504), the output variable ($\phi_o$) of the first controller network (401) which is proportional to the estimated value, can also be used directly. This is of advantage particularly if the observer equations (4a) are realized as equivalent transfer functions. This possibility is applied in the present case for generating the second angular momentum component (H$_x^*$) from the deviation signal ($\psi_o$) via third controller network (601) and a proportionality factor (1/H$_y$). As long as an attitude reference relating to the second (z−) transverse axis is available, the variable so formed is utilized to generate regulating interventions about a first (x−) transverse vehicle axis via a state controller and disturbance torque compensator (609) and a dead zone/modulator combination (506), since it furnishes equivalent values based on a direct measurement. If, however, the attitude reference for the second transverse axis is lost intermittently, recourse is had to the estimated values (H$_x$) from the observer (504). This is indicated in FIG. 6b by a double-throw switch (608, position 2). The device of FIG. (6b) is equipped in the manner already described with disturbance torque memories (511, 612), the values (T$_{D.0}$, T*$_{D.1}$, T*$_{D.2}$) of which are coprocessed in state controllers (608, 609) for variable compensation. For the interference disturbance torque compensation in FIGS. (6b) and (5c), the two components of the harmonic disturbance portion ($T_{Dx1}, T_{Dx2}$), which represent sine and cosine components of the first harmonic of a Fourier analysis, were also superimposed in the mutually orthogonal vehicle axes, because of their phase shift relative to one another.

FIG. 6c shows a further advantageous embodiment of the present invention. It is based on the knowledge that, with at least intermittent availability of measured values for the deviation of a second transverse axes from its reference direction, an identification of and compensation for the external disturbances acting on this axis must also be possible, at least as far as their constant ($T_{Dz0}$), and their slowly variable periodic components ($T_{Dz1}, T_{Dz2}$) are concerned. This purpose is served in the present embodiment by an expanded angular momentum and disturbance torque observer (606), to which are fed as input signals both processed measurement values ($\phi_o, \psi_o$) which are representative of the orbital motion and can be obtained via a first controller network (401) and a third controller network (601). For this purpose, the algorithm, used to estimate the angular momentum and the disturbance torque or the representation equivalent to this must be expanded by transfer functions and/or networks corresponding to Equation (4a) by three orders. This procedure is familiar to one of skill in the art and leads in the state representation corresponding to Equations (4a) and (4b) to a system of eight equations with the state vector:

$$X = [H_x, H_z, T_{Dx0}, T_{Dx1}, T_{Dx2}, T_{Dz0}, T_{Dz1}, T_{Dz2}] \quad (6a)$$

as well as an innovation term of the following form:

$$\begin{bmatrix} K_{11}, K_{21}, K_{31}, K_{41}, K_{51}, K_{61}, K_{71}, K_{81} \\ K_{12}, K_{22}, K_{32}, K_{42}, K_{52}, K_{62}, K_{72}, K_{82} \end{bmatrix}^T \begin{bmatrix} (|H_y|\phi_o + H_z) \\ (|H_y|_o - H_x) \end{bmatrix} \quad (6b)$$

and the control law corresponding to Equation (4b)

$$\begin{bmatrix} \eta_x \\ \eta_z \end{bmatrix} = \begin{bmatrix} K_{Hx} \, K_{Dx0} \, K_{Dx1} \, K_{Dx2} \\ K_{Hz} \, K_{Dz0} \, K_{Dz1} \, K_{Dz2} \end{bmatrix} \cdot \begin{bmatrix} H_x & H_z \\ T_{Dx0} & T_{Dz0} \\ T_{Dx1} & T_{Dz1} \\ T_{Dx2} & T_{Dz2} \end{bmatrix} \quad (6c)$$

In the control law (Equation 6c) and the corresponding FIG. (6c), only one component of the harmonic disturbance torque components ($T_{Dx1}, T_{Dz1}$) is used again because these components supplement each other if a first harmonic is present. If the disturbance torque observer is designed so that it settles to a steady state in a time significantly shorter than half an orbit period, and if, in particular, use is made of the disturbance torque memory (511, 613), portions of higher harmonics can also be determined and compensated. For the disturbance torque storage, it is sufficient to store in the realization per orbit period a certain number, for instance, 20 or 30 values with their time correlation, which represent representative mean values over associated time intervals and between which numerical interpolation for superimposition at the respectively applicable time is possible. It is again indicated in FIG. (6c) that, upon the loss of the position reference about a second transverse axis (z axis), which is indicated in the case of customary sensing elements, by a logic signal, the estimated values of the disturbance torques acting on the second transverse axis must be disconnected by a switch (615), since these variables are then not observable. For the values of the controller command gains ($T^*_{Dz0}$, $T^*_{Dz1}$) gain at the output of the disturbance torque memory (613), the last interference variables based on a valid estimation, are kept constant pursuant to the invention for the following time interval, until sensor-supported, valid estimated values are available once again or are supplemented on the basis of the preceding course of the function according to the applicable sine/cosine law. In the estimation of the disturbance torques, it is furthermore advisable to take into consideration, by suitably preprogrammed state changes, the residence time of the satellite in the previously known earth shadow phase, where the solar pressure torques disappear.

In FIG. (6d), a last embodiment of the present invention is shown. It differs from the preceding Figure (FIG. 6c) only by splitting the observer (606) for the angular momentum and the disturbance torque into a separate observer (613, 504) for each transverse vehicle axis. The form of the matrix equation (4a) is applicable to each of these units. This embodiment is recommended particularly for the realization in on-board digital computers, since the complexity is less than that of a complete observer for both axes (606), shown in FIG. (6b), because of the lower order and only repeated call-ups of an identical program part with other numerical values and input/output variables are necessary for the second vehicle axis. A further simplification is obtained, as already mentioned, if in each transverse vehicle axis the respective signal component ($\phi_o, \psi_o$) representing the orbital motion or its angular momentum equivalent ($H^*_x, H^*_z$) is used directly instead of an estimated value of the angular momentum components ($H_x H_z$), and only the respective second component is estimated. In this case also, the angular momentum component ($H_x$) pointing in the direction of a first transverse vehicle axis must be switched over upon loss of the position reference about the second transverse axis, and the estimated disturbance torque values switched off via the switches (611, 615) indicated.

The step-by-step improvement in the dynamic behavior of the transverse axes motions of a three-axes-stabilized satellite of the type under consideration, if the various embodiments of devices of the present invention for control and stabilization are used, is evident from FIGS. (7a) to (7c). For a typical space vehicle, corresponding to that of FIG. (1a), and a component arrangement according to FIG. (1c), the described controller algorithms were realized and checked for operability while retaining the characteristic system parameters and disturbance torque profiles. The motion over a full orbiting period of the vehicle axes (X, Z), which are arranged transversely to the stored spin ($H_y$) and orthogonally relative to each other, was plotted in the customary representation as a function of one another in a Cartesian coordinate system, similar to that already utilized for explaining the dynamic processes in FIGS. (4c) and (4d). The Euler angles ($\phi, \psi$) represent angular deviations of the vehicle roll or yaw axis from their set values, i.e., the ideal orientations of an orbit coordinate system carried along, as shown in FIG. (1a). The curves can again be interpreted graphically as the motions of the tip of the vehicle spin vector in the orbit plane.

The simulation result according to FIG. (7a) refers to a control device of the first type according to FIG. (3), which is designed in accordance with the features of claim 1. To one of skill in the art, the improvement with respect to energy-wise optimum regulating interventions can be recognized from the fact that regulating interventions take place if and only if the measured deviation of the first transverse axis (x axis) from its set direction reaches the response thresholds ($\pm h_E$, FIG. 3) built into the modulator. In the present case, the response threshold was set at values of $\pm 0.6°$. However, because of the system-related noise, which is superimposed on the deviation signals, response threshold triggers already regulating interventions usually when the orientation error is $\pm 0.5°$. In conventional control systems of this type, regulating interventions also occur within the dead zone region. The regulating interventions are triggered by the nutation damping logic described (FIG. 2), and would be recognizable by abrupt changes of the nutational motion within the dead zone region.

The dynamic behavior generated by a device according to FIG. (4a) is shown in FIG. (7b). The mode of functioning of the inventive device of the second type is clearly recognizable from the fact that the average orientation accuracy with respect to a first transverse vehicle axis (x axis) which, according to the explanations above, lies at the center of the respective nutation circles, is $\pm 0.3°$, i.e., twice as good as in the case of FIG. (7a). As can be seen clearly, the improvement in the accuracy of the command control about the first transverse axis results in a substantial improvement in the orientation accuracy about the second transverse axis, the yaw or z axis, which is taken along via the angular momentum coupling. This effect is achieved by the inventive control device without the slightest additional cost for regulating energy.

FIG. (7c) shows the simulation result of a further embodiment of the invention of the second type corresponding to FIG. (6d). It was assumed here that, for a satellite in a geostationary orbit, no position reference regarding the second transverse vehicle axis is available for a period of 4 hours and that the disturbance torques are kept constant during this period to the last valid estimated values in the manner described. As can be seen from FIG. (7c), the achievable orientation accuracy with respect to the second transverse axis ($\psi$) is extremely high and, for the period mentioned, is entirely comparable with that of the first transverse axis ($\phi$), in spite of the loss of information for the second transverse axis (z axis).

With the present invention, one of skill in the art is provided with a number of novel possibilities for controlling the reference value and stabilizing free to move bodies with stored angular momentum. These make it possible to fulfill the requirements set for the various embodiments in an energetically optimum manner without additional expense for equipment.

The detailed description of the physical relationships, on which the inventive concept is based, and their refinement in the different embodiments, moreover enables one of skill in the art to make suitable adaptations for the respective application and optionally also modifications of the data processing algorithms and control laws. For instance ,the nutation measuring and control branch, explained in different stages of development, was built up with the functional elements (402), (403), (407), to (410) in FIGS. (4a), (5a), and (508) to (510), in FIGS. (5a) to (5c) or (610) in FIGS. (6a) to (6d) basically on the formation of an angular velocity signal ($W_x$, $W_z$) for the nutational motion of the space vehicle. If such a variable is derived from an attitude measuring system ($\epsilon_\phi$), the nutation measuring and control branch requires the realization of a differentiating section or, at least, a high-pass filter section with differentiating properties in the frequency range of the nutation oscillation. In view of the already mentioned worsening of the signal-to-noise ratios due to such a measure, this procedure is recommended only if the ratio of the high-frequency disturbance (sensor noise) superimposed on the (deviation) measurement signals, to the amplitude of the useful signal is still bearable. While the signal-to-noise ratios can be improved again by additional measures, which have also already been mentioned, in particular by nonlinear filters with a small phase loss, a simple re-design of this signal path leads to the same, if not to even better results in such a case. If namely the signal processing and control branch of angular velocity signals ($W_x$, $W_z$) is translated into position angle signals ($\phi_N$, $\psi_N$), which is possible without difficulty by a logical adaptation of a nutation observer and amplitude-phase converter, the differentiating section (407) is eliminated completely and accordingly also its adverse effect on the interference noise. The matrix equation (3c) for the complete nutation observer (408,508 depending on the embodiment) then has the form (3c*):

$$\begin{bmatrix} \dot\phi_N \\ \dot\psi_N \end{bmatrix} = \tag{3c*}$$

$$\begin{bmatrix} 0 & -\frac{1}{I_x}[(I_y - I_z)W_o - H_y] \\ -\frac{1}{I_z}[(I_x - I_y)W_o + H_y] & 0 \end{bmatrix} +$$

$$\begin{bmatrix} k_1^* \\ k_2^* \end{bmatrix}[\phi_N - \phi_N] + \begin{bmatrix} -\frac{1}{H_y}T_{cz} \\ \frac{1}{H_y}T_{cx} \end{bmatrix}$$

wherein $\phi_N$— is the attitude component of the measured signal representative of the nutational motion as the input variable and $\phi_N$, $\psi_N$— are the estimated values for the roll angle component ($\phi_N$) and the yaw angle component ($\psi_N$) of the nutation oscillation as the output gain factors of this observer ($K_1^*$, $K_2^*$) then receive in a known manner suitably adapted physical dimension and numerical values as in Equation (3c).

The computing instructions for the modulus ($A^*_N$) and the phase angle ($\beta^*_N$) according to Equation (3e) and (3f), on which the downstream amplitude-phase converter is based, then read correspondingly (3e*, 3f*):

$$A_N^* = \sqrt{\phi_N^2 + \frac{I_z}{I_x}\psi_N^2} \tag{3e*}$$

$$\beta_N^* = \text{arctg}\left[\frac{\phi_N}{-\sqrt{\frac{I_z}{I_x}} \cdot \psi_N}\right] \tag{3f*}$$

The phase conditions for the generation of regulating pulses (Equation 3g and those that follow, as well as Tables 1 and 2) remain untouched by the modification. In a manner similar to that shown above for the computing instructions for nutation observers and amplitude-phase converters, one of skill in the art, knowing the teachings of the invention, can formulate the logical conditions for triggering regulating intervention on the basis of intervention criteria, which are defined differentially but are equivalent in their effect. This can be done, for instance, with the help of the vectors of the nutational motions ($A_{N1}$, $A_{N2}$ in FIG. 4c) and the angular momentum shift vectors ($O_1 O_2$ in FIG. 4c, $P_I P_{I^*}$ and $P_V P_{I^*}$ in FIG. 6 c) or their vectors components, which are indicated in FIGS. (4c) and (6e), in a suitable coordinate system, for instance, that chosen there.

In conclusion, possibilities for a substantial expansion of the areas of use of the inventive control devices should be pointed out. Heretofore, the areas of use of space vehicles of the type under consideration have been tied to the close surroundings of the given mission, which is connected by the necessary earth coverage areas of the transmitting and receiving devices and the corresponding arrangement of the antennas with respect to the vehicle axes. In most cases, the required earth coverage areas lie in the northern hemisphere and their upkeep for communication traffic between continents, such as Europe and the U.S.A., is assured by suitable antenna reflectors, which are directed, northeast and northwest as seen from the satellite. Space vehicles with the same payload configuration can also serve, if necessary, earth coverage areas in the southern earth hemisphere at approximately the same geographic latitude and longitude difference, such as Africa and South America, provided at its is possible to operate such satellites in an angular attitude rotated 180° about the vehicle axis pointing to the center of the earth, i.e., when they are upside down. Control systems for vehicles with stored angular momentum of the type described are stable under such operating conditions only if the stored angular momentum, relative to the satellite coordinate system has its "polarity reversed" and the algebraic sign of the regulating interventions is reversed about the second transverse vehicle axis, which is taken along by the angular momentum coupling and/or is controlled directly. This is possible without difficulties in all embodiments of the present invention that have been described, provided that the final control elements, which generate the control torques about a respective first transverse vehicle axis, are deliberately disposed so that they do not also supply torque components of opposite algebraic sign about a respective second transverse vehicle axis simultaneously with each regulating intervention, for example, through being installed obliquely. Instead, the final control elements, which are provided especially for this purpose, are used to generate the torque increments about this second axis and are also activated with the correct algebraic signal corresponding to the algebraic signal of the stored angular momentum. This possibility was already explained in conjunction with the embodiment according to FIG. (6a). Knowing the teachings relating to the technical action according to the present invention, one of skill in the art will have no difficulty with making the analogous allocation of the required regulating interventions for the various embodiments. It is a simple characteristic rule that he torque coupling factor (215, FIGS. 2, 3) must have the same algebraic sign in an orbit coordinate system according to FIG. (1a), as the y component of the vehicle angular momentum vector ($H_y$) and the angular velocity vector ($\underline{W}_o$) of the orbiting frequency.

TABLE 1

TABLE 1 FOR FIG. 5e

| SECTOR (FIG. 6e) | DEVIATION ANGLE | | SPIN DEVIATION | | REGULATING INTERVENTION | | OPTIMUM PHASE ANGLE |
|---|---|---|---|---|---|---|---|
| | $\phi_o$ | $\psi_o$ | $H_z$ | $H_x$ | $\Delta T_z$ | $\Delta T_x$ | $\delta_o$ |
| I ÷ V | $> +d_\phi$ | $> -d_\psi$ | $< -d_{Hz}$ | $> -d_{Hx}$ | 0 | − | $2\pi - \alpha$ |
| II − VII | $< -d_\phi$ | $< +d_\psi$ | $> +d_{Hz}$ | $< +d_{Hx}$ | 0 | − | $\pi - \alpha$ |
| III ÷ VI | $< +d_\phi$ | $> +d_\psi$ | $> -d_{Hz}$ | $> +d_{Hx}$ | − | 0 | $\frac{\pi}{2}$ |
| IV ÷ VIII | $> -d_\phi$ | $< -d_\psi$ | $< +d_{Hz}$ | $< -d_{Hx}$ | + | 0 | $\frac{3}{2}\pi$ |

TABLE 2

TABLE 2 FOR FIGS. 6a–6e

| SECTOR (FIG. 6e) | DEVIATION ANGLE | | SPIN DEVIATION | | REGULATING INTERVENTION | | OPTIMUM PHASE ANGLE |
|---|---|---|---|---|---|---|---|
| | $\phi_o$ | $\psi_o$ | $H_z$ | $H_x$ | $T_{cz}$ | $T_{cx}$ | $\delta_o$ |
| I | $> d_\phi$ | $-d_\psi < \psi_o < +d_\psi$ | $< -d_{Hz}$ | $-d_{Hx} < H_x < -d_{Hx}$ | + | 0 | $\frac{3}{2}\pi$ |
| II | $< -d_\phi$ | $-d_\psi < \psi_o < d_\psi$ | $> d_{Hz}$ | $> -d_{Hx}$ $< +d_{Hx}$ | − | 0 | $\frac{\pi}{2}$ |
| III | $> -d_\phi$ $< +d_\phi$ | $> d_\psi$ | $> -d_{Hz}$ $< +d_{Hz}$ | $> d_{Hx}$ | 0 | − | $2\pi - \alpha$ |
| IV | $> -d_\phi$ $< +d_\phi$ | $< -d_\psi$ | $> -d_{Hz}$ $< +d_{Hz}$ | $< -d_{Hx}$ | 0 | − | $\pi - \alpha$ |
| V | $> +d_\phi$ | $> d_\psi$ | $< -d_{Hz}$ | $> +d_{Hx}$ | − | − | $\frac{7}{4}\pi - \alpha$ |

TABLE 2-continued

TABLE 2 FOR FIGS. 6a-6e

| SECTOR (FIG. 6e) | DEVIATION ANGLE | | SPIN DEVIATION | | REGULATING INTERVENTION | | OPTIMUM PHASE ANGLE |
|---|---|---|---|---|---|---|---|
| | $\phi_o$ | $\psi_o$ | $H_z$ | $H_x$ | $T_{ez}$ | $T_{ex}$ | $\delta_o$ |
| VI | $<-d_\phi$ | $>+d_\psi$ | $>d_{Hz}$ | $>d_{Hx}$ | − | − | $\frac{\pi}{4} - \alpha$ |
| VII | $<-d_\phi$ | $<d_\psi$ | $<d_{Hz}$ | $<-d_{Hx}$ | − | + | $\frac{3}{4}\pi - \alpha$ |
| VIII | $>d_\phi$ | $<d_\psi$ | $<-d_{Hz}$ | $<-d_{Hx}$ | + | + | $\frac{5}{4}\pi - \alpha$ |

We claim:

1. Apparatus for controlling the attitude of and stabilizing an elastic body having a bias angular momentum with associated spin axis and being free to rotate about three mutually orthogonal body axes, especially aircraft and space vehicles, with respect to reference values for two of said body axes disposed transversely to said spin axis, said two body axes being vehicles axes, by means of an attitude sensor measuring deviations of a first one of said transverse axes from a reference direction, at least one controller, at least one modulator and at least one final control element generating control torques about both transverse axes, wherein regulating signals to control the reference value with respect to the first transverse axis (x axis), to stabilize with respect to a second transverse axis (z axis) and simultaneously to dampen oscillations about both transverse axes ar obtainable from said attitude sensor comprising a uniaxially measuring attitude sensor (202) by means of said controller (301), said controller having a transfer function having a denominator three orders greater than its numerator.

2. Apparatus according to claim 1, further comprising a pseudo rate modulator (204) for addressing the final control element and a controller network having a numerator polynomial of at least the first order and a denominator polynomial of at least the fourth order.

3. Apparatus according to claim 1, further comprising a pulse width-pulse frequency modulator for addressing the final control element (213) and a controller network having a transfer function having a numerator of at least second order and a denominator of at least fifth order.

4. Apparatus according to claim 1, wherein signals obtainable from the controller (301) via a modulator (204) can be used simultaneously for addressing the final control element generating control torques about said first transverse vehicle axis and the final control element generating control torques of opposite algebraic signal about said second transverse vehicle axis (z axis).

5. Apparatus for controlling the attitude of and stabilizing an elastic body performing an orbital motion about a celestial body like the earth and being subject to disturbance torques causing nutational motion thereof, the elastic body having a bias angular momentum with associated spin axis and being free to rotate about three mutually orthogonal body axes, especially aircraft and space vehicles, with respect to reference values for two of said body axes disposed transversely to said spin axis, said two body axes being vehicles axes by means of at least one attitude sensor measuring deviations of a first one of said transverse axes from a reference direction, at least one controller, at least one modulator and at least one final control element generating control torques about both transverse axes, wherein, from a measuring signal for the deviation ($\epsilon_\phi$) of a said first transverse axis, a first signal component ($\phi_o$) representative of a first component of the orbital motion is obtainable via a first controller network (401), and a second signal component ($\phi_N$) representative of the nutation motion is obtainable via a second controller network (402), the two signal components being linked in a nutation controller (410) such that, by means of the first signal component ($\phi_o$) representing the first component of the orbital motion, after passing through at least a first angular momentum controller (404), at least a first dead-zone section (405) an at least a first modulator network (406), a logical decision concerning the need for, the algebraic sign of and the duration of control actions can be made and, with the second signal component ($\phi_N$) representing the nutational motion, after the signal is processed in at least one differentiating section (407), at least one nutation observer (408) and at least one amplitude/phase converter (409), the time for the action of the final control element generating control torques about both transverse axes can be fixed within a nutation period ($1/W_N$).

6. Apparatus for controlling the attitude of and stabilizing an elastic body performing an orbital motion about a celestial body like the earth and being subject to disturbance torques causing nutational motion thereof, the elastic body having a bias angular momentum with associated spin axis and being free to rotate about three mutually orthogonal body axes, especially aircraft and space vehicles, with respect to reference values for two of said body axes disposed transversely to the spin axis, said two body axes being vehicles axes, by means of at least one attitude sensor at least temporarily measuring deviations of the two transverse axes from respective reference directions, at least one controller, at least one modulator and at least one final control element generating control torques about both transverse axes, wherein a first signal component ($\phi_o$) for a first component of the orbital motion obtainable from a measuring signal for the deviation ($\epsilon_\phi$) of a first one (x axis) of said transverse axis via at least one first controller network (401), and a third signal component ($\psi_o$) for a second component of the orbital motion additionally obtainable from a measuring signal for a deviation ($\psi$) of a second one (z axis) of said transverse axes via at least one third controller network (601) are linked in at least one nutation controller (610) with a second signal component ($\phi_N$), which is representative of the nutational motion and obtainable via at least one second controller network (402), such that by means of the first signal component ($\phi_o$) representing the first component of the orbital motion, after passing through at least one first angular momentum controller (404), at least one first dead zone section (405) and at least one first modulator network (604), a decision can be made concerning the need for, the algebraic signal of and the duration of a control action about said second vehicle axis (z axis), by means of the third signal component ($\psi_o$), representing the second component of the orbital motion, and after passing through at lest one second angular momentum controller (602), at least one second dead-zone section (603) and at least one second modulator network (605), a decision can be made concerning the need for, the algebraic sign of and the duration of control actions about said first vehicle axis (x axis), and, with the second signal component ($\phi_N$) representing the nutational motion, after said second signal component is processed in at least one differentiating section (407), at least one nutation observer (508) and at least one amplitude/phase converter (509), times for the control actions about at least one of said first and second transverse axes can be fixed within a nutation period.

7. Apparatus according to claim 5 or 6, wherein the first controller network (401) comprises a low-pass filter for obtaining the signal component ($\phi_o$) representative of the first component of the orbital motion and the second controller network (402) comprises a filter with high-pass character for forming the signal component ($\phi_N$) representative of the nutational motion.

8. Apparatus according to claim 5 or 6 with at least one additional sensor, for instance, a rate gyroscope, measuring angular velocity about at least one of said transverse axes wherein second signal components ($W_x$ or $W_x$, $W_z$), representative of the nutational motion ($W_N$), can be obtained from a measurement signal of the additional sensor at least one of directly and in conjunction with a high-pass filter and said nutation observer.

9. Apparatus for controlling the attitude of and stabilizing an elastic body performing an orbital motion about a celestial body like the earth and being subject to disturbance torques causing nutational motion thereof, the elastic body having a bias angular momentum with associated spin axis and being free to rotate about three mutually orthogonal body aces, especially aircraft and space vehicles, with respect to reference values for two of said body axes disposed transversely to the spin axis, said two body axes being vehicle axes, by means of at least one attitude sensor at least temporarily measuring deviations of the two transverse axes from respective reference directions, at least one controller, at least one modulator and at least one final control element generating control torques about both transverse axes, wherein a first signal component ($\phi_o$) for a first component of the orbital motion obtainable from a measuring signal for the deviation ($\epsilon_\phi$) of a first one (x axis) of said transverse axes via a first controller network (401), and a third signal component ($\psi_o$) for a second component of the orbital motion additionally obtainable from a measuring signal for a deviation ($\psi$) of a second one (z axis) of said transverse axes via a third controller network (601) are linked in a nutation controller (610) with a second signal component ($\phi_N$) which is representative of the nutational motion and obtainable by subtracting said first signal component ($\psi_o$) from said measuring signal in a summing element (403) (402), such that any means of the first signal component ($\phi_o$) representing the first component of the orbital motion, after passing through at least one first angular momentum controller (404), at least one first deadzone section (405) and at least one first modulator network (604), a decision can be made concerning the need for, the algebraic signal of and the duration of a control action about second vehicle axis (z axis), by means of the third signal component ($\psi_o$), representing the second component of the orbital motion, and after passing through at least one second angular momentum controller (602), at least one second dead-zone section (603) and at least one second modulator network (605), a decision can be made concerning the need for, the algebraic signal of and the duration of control actions about said first vehicles axis (x axis), and, with the second signal component ($\phi_N$) representing the nutational motion, after the signal is processed in at least one differentiating section (407), at least one nutation observer (508) and at least one amplitude/phase converter (509), times for the control actions about at least ne of the first and second transverse axes can be fixed within a nutation period.

10. Apparatus according to claims 6 or 9, wherein estimated values of at least one of constant and of periodic disturbance torque components, formed in at least one angular momentum and disturbance torque observer (504, 606, 613) used as said first and said second angular momentum controllers (404, 602) can be supplied via gain factors to following combinations of said at least one first dead zone section (405) and said at least one first modulator network (604), either directly or via disturbance torque memories (511, 612, 611), the values of which at a cut-in time correspond to the disturbance torque estimated at the same point in the orbit of the vehicle during the preceding orbiting period.

11. Apparatus according to claim 10, wherein estimated values of disturbance torque components, acting on said second transverse vehicle axis and obtainable from the deviations of the second transverse vehicle axis via the third controller network (601), and angular momentum and the disturbance torque observer (613), can be made inoperative in the event of an intermittent loss of the attitude reference with respect to the second transverse vehicle axis and values of the disturbance torques, based on a last valid estimation, can be supplied at least one of directly and via said disturbance torque memory (611) to said following at least one first modulator (604) to compensate for the disturbance torques.

12. Apparatus according to claims 6 or 9 wherein the components of the vehicle angular momentum obtainable directly via at least one of the first and the third controller network from measurements of the deviations of at least one of said first ($\epsilon_\phi$) and said second ($\epsilon\psi$) vehicle axes from the reference direction can be replaced upon intermittent loss of the reference with respect to one of said transverse vehicle axes (X y axis) by estimated values ($H_x$, $H_z$) of the components of the vehicle angular momentum, which are obtainable from a measurement of the deviation of the respective other transverse axis.

13. Apparatus according to claims 6 or 9, wherein the algebraic signs of the final control element generating control torques about the second transverse vehicle axis are reversible, depending on the algebraic sign of the vehicle bias angular momentum.

14. Apparatus for controlling the attitude of an stabilizing an elastic body performing an orbital motion about a celestial body like the earth and being subject to disturbance torques causing nutational motion thereof, the elastic body having a bias angular momentum with associated spin axis and being free to rotate about three mutually orthogonal body axes, especially aircraft and space vehicles, with respect to reference values for two of said body axes disposed transversely to said spin axis, said two body axes being vehicle axes, by means of an attitude sensor measuring deviations of a first one of said transverse axes from a reference direction, at least one controller, at least one modulator and at least one final control element generating control torques about both transverse axes, wherein, from a measuring signal for the deviation ($\epsilon_\phi$) of a first transverse axis, the first signal component ($\phi_o$) representative of a first component of the orbital motion is obtainable via a first controller network (401), and a second signal component ($\phi_N$) representative of the nutational motion is obtainable by subtracting said first signal component ($\phi_o$) from said measuring signal in a summing element (403), the two signal components being linked in a nutation controller (410) such that, by means of the first signal component ($\phi_o$) representing the first component of the orbital motion, after passing through at least one first angular momentum controller (404), at least one first dead-zone section (405) and at least one first modulator network (406), a logical decision concerning the need for, the algebraic sign of and the duration of control actions can be made and, with the second signal component ($\phi_N$) representing the nutational motion, after the signal is processed in a differentiating section (407), nutation observer (408) and amplitude/phase converter (409), the time for the control action of the final control element generating control torques about both transverse axes can be fixed within a nutation period ($1/W_N$).

15. Apparatus according to claims 5, 6, 14 or 9, wherein, for generating triggering pulses for discretely operating the final control element, said at lest one first modulator network is used, the at least one modulator having a repetition frequency of constant pulses of which, upon exceeding of a first response threshold ($\pm d_1$) by a modulator input signal and a pulse width ($\Delta t_{cx}, \Delta t_{cz}$) at constant repetition frequency of which, upon exceeding a second response threshold ($\pm d_2$, $|d_2| > |d_1|$) by the modulator input signal, can be varied proportionally to the modulator input signal such that generated pulse-time areas increase and decrease linearly with the modulator input signal.

16. Apparatus according to claims 5, 6, 14 or 9, wherein said at least one first angular momentum controller (404) comprises at least one of a simple gain factor, correctional element of the first or second order, a PID controller, an observer algorithm serving the estimation of components of the vehicle angular momentum ($H_x, H_z$) and a constant or periodic disturbance torque component (for example, $T_{Dx0}, T_{Dx1}, T_{Dx2}$) of the vehicle.

17. Apparatus according to claims 5, 6, 14 or 9, wherein said amplitude-phase converter comprises at least one of an algorithm for forming plane Cartesian/polar coordinate transformations and a circuit equivalent to such algorithm.

18. Apparatus according to claim 5, 6, 14 or 9, wherein the nutation amplitude ($A_N$) and phase angle of the nutation ($\beta_N$) can be determined by the amplitude-phase converter according to the relations:

$$A_N = \sqrt{\frac{W_x^2}{W_N^2} + \frac{W_z^2}{W_N^2} \cdot \frac{I_z}{I_x}} \text{ and}$$

$$\beta_N = \text{arctg} \frac{\frac{I_z}{I_x} \cdot W_z}{W_x}$$

wherein:
$W_X, W_Z$— are output signals of a nutation observer (408, 508), and
$W_N$— is the nutation frequency.

19. Apparatus according to claims 5, 6, 14 or 9, wherein the time for generating a control action within a nutation period can be determined by the condition:

$$\gamma_o + \Delta\gamma - \Delta\beta \leq \beta_N(t) \leq \gamma_o + \Delta\gamma + \Delta\beta$$

provided that $$\frac{1}{2} \leq \frac{A_N}{\Delta P} \leq \frac{3}{2}$$

and otherwise:

$$\gamma_o - \Delta\beta \leq \beta_N(t) \leq \gamma_o + \Delta\beta$$

wherein
$A_N, \beta_N$— are the nutation amplitude and phase, respectively,
$\Delta_P$— angular momentum increment of an angular momentum action, normalized on the vehicle angular momentum,
$\Delta\beta$— is the tolerance range of a control action angle,
$\gamma_o$— the direction of action of an angular momentum increment generated by a control action in the trajectory plane relative to the initial nutation angle ($\beta_N$) and $$\Delta\gamma(t) = \arccos\left(\frac{1}{2} \cdot \frac{A_N}{\Delta P} + \frac{3}{8} \cdot \frac{\Delta P}{A_N}\right)$$

or approximately $$\Delta\gamma(t) = \sqrt{1 - \left(\frac{1}{2} \cdot \frac{A_N}{\Delta P} + \frac{3}{8} \cdot \frac{\Delta P}{A_N}\right)^2}.$$

20. Apparatus according to claims 5, 6, 14 or 9, wherein times for generating two optimum control actions ($\beta_{N1}, \beta_{N2}$) within a nutation period can be determined by the conditions $$\gamma_o - \Delta\gamma_1 - \Delta\beta \leq \beta_{N1}(t) \leq \gamma_o - \Delta\gamma_1 + \Delta\beta$$

for a first of said two optimum control actions provided that:
$A_N \leq 2P$
and $$\gamma_o - \Delta\beta \leq \beta_{N2}(t) \leq \gamma_o + \Delta\beta$$

for a second of said two control actions wherein
$A_N, \beta_N$— are the nutation amplitude and rotation phase angle,
$\Delta\beta$— is a predetermined tolerance of the control action time,
$\gamma_o$— is the direction of action of an angular momentum increment generated by a control action in orbit coordinates and $$\Delta\gamma_1 \stackrel{\Delta}{=} \arccos\left(\frac{A_N}{2\Delta P}\right)$$

and
$\Delta\gamma_1 = 0$ if $A_N > 2\Delta P$

21. Apparatus according to claims 5, 6, 14 or 9, wherein system related, variable parameters obtainable via at least one of an additional measurement value and a functional relationship, such as bias angular momentum ($H_{[x]y}$) and effectively generated control increments ($\Delta T_{cx}, \Delta T_{cz}$), are introduced into algorithms embodied in said at least one nutation observer, said at least one amplitude/phase converter and said at least one nutation controller.

22. Apparatus according to claims 5, 6, 14 or 9, wherein times for control actions about at lest one of the first and the second transverse axes within a nutation period can be fixed with the second signal component ($\phi_N$), representing the nutational motion, after signal processing in at least one of the complete or reduced nutation observer and said amplitude/phase converter and their functionally equivalent electrical networks or computing algorithms.

* * * * *